Jan. 3, 1967  J. L. SAUVAN  3,296,593
INFORMATION-PROCESSING SYSTEM

Filed Sept. 25, 1962  7 Sheets-Sheet 1

INVENTOR
JACQUES LOUIS SAUVAN
BY Bacon & Thomas
ATTORNEYS

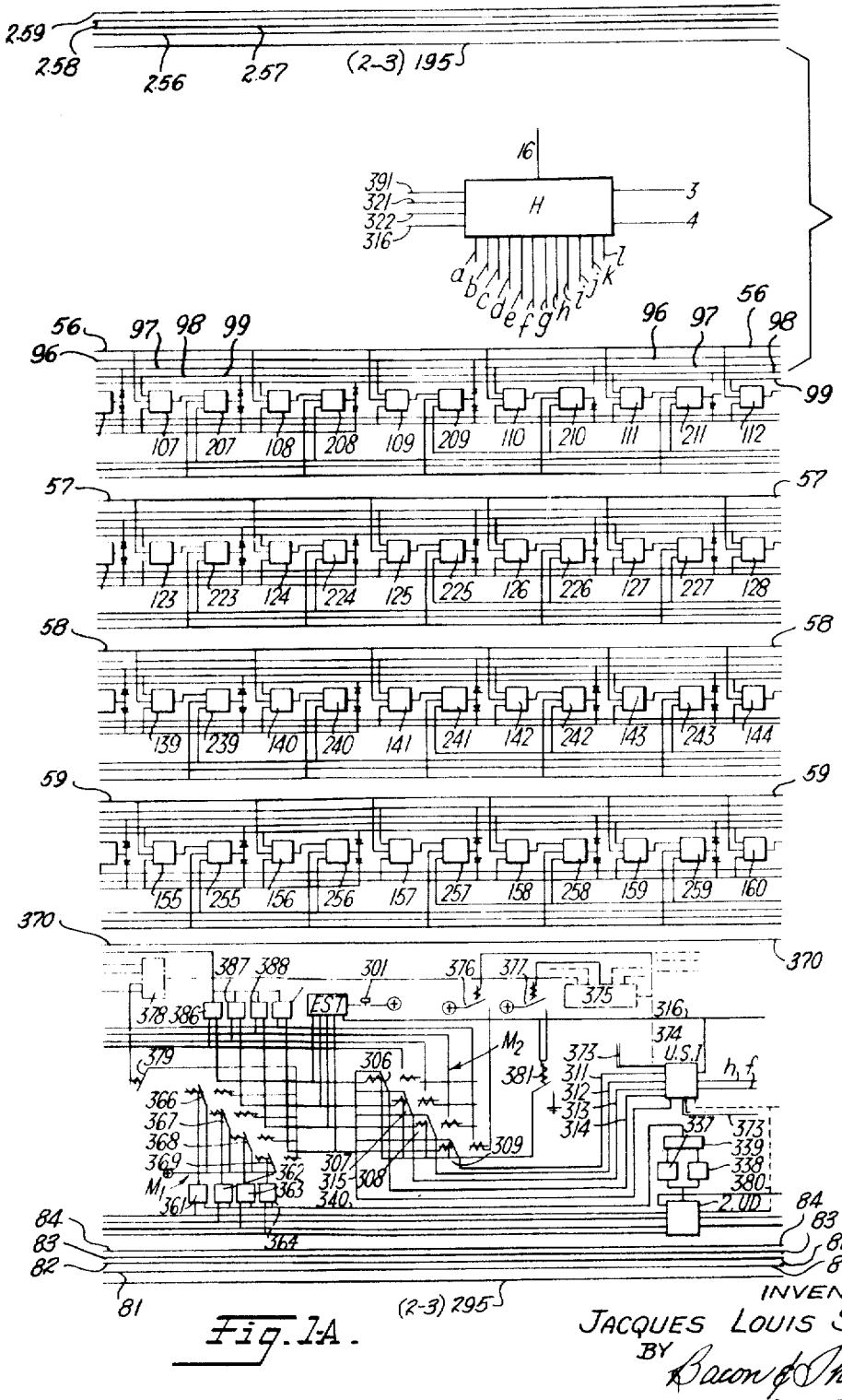
Fig. 1-A.
INVENTOR
JACQUES LOUIS SAUVAN
BY Bacon & Thomas
ATTORNEYS

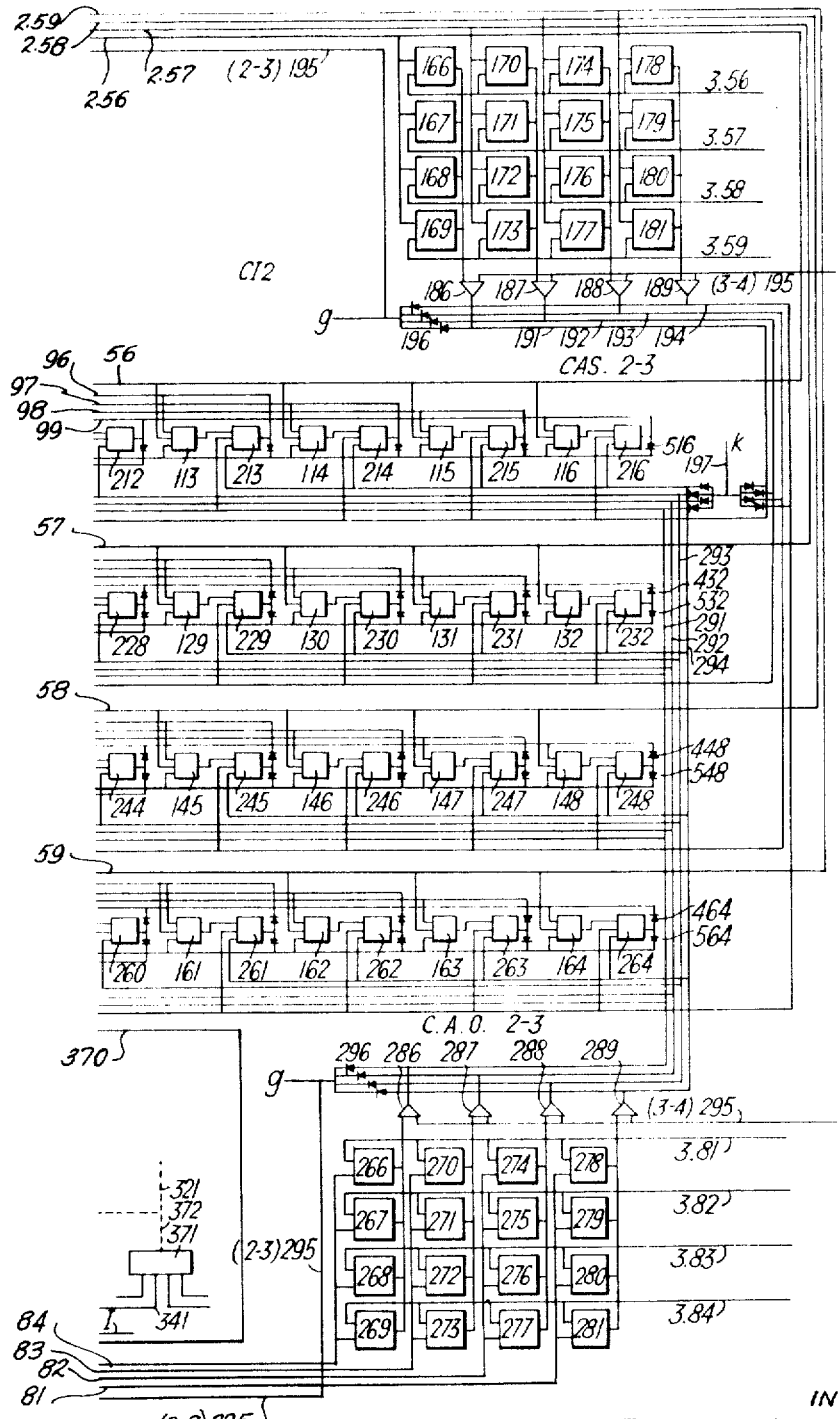
Fig. 1-B.

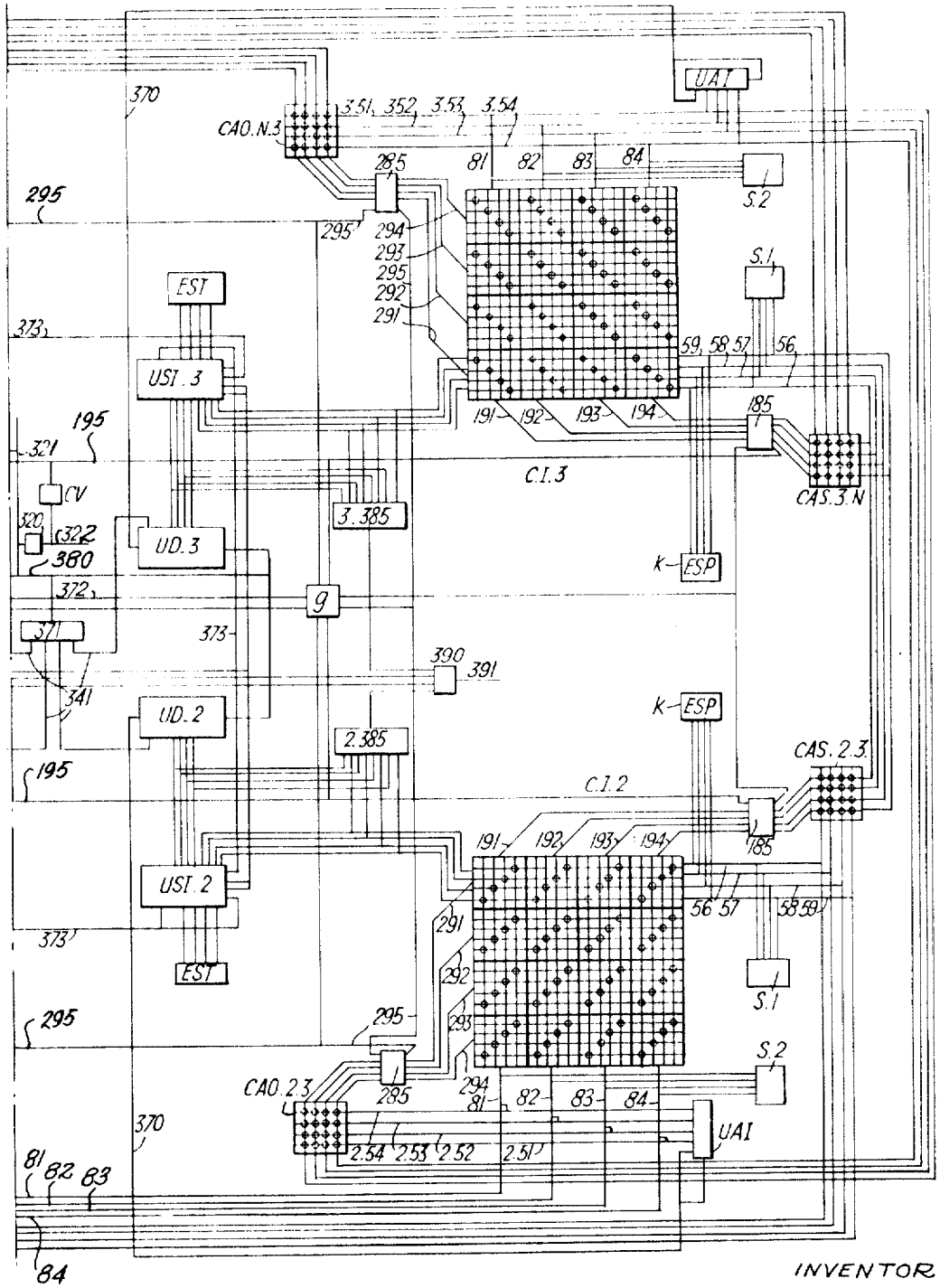
Fig. 2-A

United States Patent Office 3,296,593
Patented Jan. 3, 1967

3,296,593
INFORMATION-PROCESSING SYSTEM
Jacques Louis Sauvan, Antibes, Alpes-Maritimes, France, assignor to Société Nationale d'Etude et de Construction de Moteurs d'Aviation, Paris, France, a joint-stock company of France
Filed Sept. 25, 1962, Ser. No. 226,110
Claims priority, application France, Sept. 30, 1961, 874,673
15 Claims. (Cl. 340—172.5)

This invention relates to a novel method of processing information relating to causal sequences, whereby information describing a process of unpredictable change can be memorized, and subsequently recalled and analysed, without there being any limitation to the duration and complexity of the process investigated. The invention more particularly relates to a novel memory or storage apparatus adapted for the implementation of such a method.

The basic idea underlying this invention is that any real process unfolding in time, of any character whatever and no matter how complex, involved and unpredictable, is necessarily describable as a sequence of unit steps each having an identical logical or causal structure; to wit, each step necessarily comprises an initial state, an action, and a resulting state, the result of said action applied to said initial state; moreover, in any such sequence the initial state of the next step is the same as the resulting state of the preceding step. In the following, each such step of a causal sequence, combining an initial state, an action, and a resulting state, will be termed an "act."

In any real system subject to a process of unpredictable change and requiring investigation, such as the operation of a machine or other system exposed to unpredictable influences from changing environmental conditions and voluntary commands, the number of states assumable by the system is necessarily finite, and the number of actions applicable to each state for changing it into another state is necessarily finite. Hence also, the number of acts is finite. However, the number of possible causal sequences (or temporal paths) for changing from some initial state through any number of intermediate states to some final state is substantially unlimited, and therein resides the unpredictability of the system's behavior when exposed to unforeseeable changes in environment and/or control. In other words, such unpredictability is never predicated on the illimited number of states and actions the system can undergo, but rather on the unlimited number of ways it can pass from one state to another.

Since the number of states and actions, respectively, is finite, each state and each action can be assigned a digital value. Bearing in mind the previous statement concerning the structure of each unit step or "act," it follows that each act of a sequence can be fully described by a group of three digital values, the values assigned to the initial state, the action and the resulting state constituting the act.

Such a group of three digital values can in turn be regarded as defining the three respective coordinates of a point in a three-dimensional array. According therefore to a basic aspect of the invention, there is provided a system for processing information concerning a sequence of states each changing into the next as the result of an action, in which system each of the unitary steps or acts of the sequence is represented as a point in a three-dimensional array (or as a set of points in a set of such arrays), each point having as its three coordinates (or each set of points having as its three sets of coordinates), digital signal values assigned to an initial state, an action and a resulting state of the related step or act of the sequence.

In accordance with the above, a memory or storage apparatus according to the invention may comprise at least one three-dimensional matrix array of settable storage elements each having three inputs, and each element being settable (e.g. to a 1-state) on concurrent energization of its three inputs; three input assemblies for said (or each said) array providing digital information signals referring to an initial state, an action and a resulting state respectively; said storage elements corresponding in number to the number of possible combinations of said initial states, actions and resulting states; means for applying said information signals to the respective inputs of selected storage elements whereby the setting of a storage element will indicate a particular causal relationship between an initial state, an action and a resulting state, such relationship being defined as an act; and information extracting means for sensing the particular elements that are set.

In such a memory matrix, it will be observed, the setting of each element of the matrix represents an elementary causal relationship or act of the "universe" or environment to which the memory responds, and thus represents much more than a single item of binary information represented by the setting of an element in a conventional matrix memory, be it three-dimensional in nature. The invention thus provides a means of memorizing, and later recalling, causal sequences of any complexity and length likely to occur within the bounds of a given set of environmental rules, or of laws governing the afore-mentioned "universe" of the memory, even though such sequences are unpredictable and unlimited within the full meaning of these words. It thus becomes possible to memorize and keep track of complete processes of any nature, provided only that each of the elementary states and actions (in finite numbers) of the process can be assigned a specific digital signal value to provide a particular input to the memory matrix. Thus the system makes possible the storing, in unlimited quantity, of the data describing the events in an evolving situation, or process, together with the order or sequence in which the events occur. No matter how long the machine or system associated with the memory of the invention may be operated, the memory will receive any new group of data describing an event in which the machine or system is involved, will store it at a pertinent location of the memory if it has not been stored already, and will in any case memorize the causal (or temporal) relationship linking that event with the one preceding it and the one following it. Redundancy is avoided.

Objects of the invention therefore include the provision of an improved method and system for the handling of information relating to causal sequences and processes; an improved memory or storage device having an unlimited storage capacity with respect to the particular set of laws (known or unknown) of the machine or system with which the memory is associated; an improved memory in the form of a three-dimensional matrix of settable elements in which the setting of each element will represent a complete event or act; an improved storage device so arranged and operated that it will memorize causal sequences of acts unlimited in length, and permit total recall of such sequences as well as parts thereof, the acts constituting the units of the sequences, and the component states and actions of such acts.

The invention is broadly applicable for use with any system involving the storing of information that is to be recalled or reused at a subsequent time. It is especially useful in connection with systems adapted for operation in accordance with a variable stored program which may be modified either through the "experience" acquired by a machine in previous operation, and/or through the spontaneous modification of certain external reference parameters controlling the operation of the system. A few non-restrictive examples of fields to which the invention is especially applicable include games; language-translation; economic and sociological analysis and forecasting; strategical (or logistic) analysis and control of complex strategical systems; control of industrial processes involving fully autonomous machinery endowed with independent activity; and the like fields.

The improved memory system, according to a further object of the invention, is capable of learning activity, particularly in the following sense: when commanded to do so, e.g. by the system or machine with which the memory is associated, the memory will pick out and display the shortest permissible sequence of causal relationships connecting any two given states that have previously been stored in the memory, out of any number of such connecting sequences that may have previously occured, or derivable therefrom. This shortest sequence thus picked out can then be used for example, in subsequent operation of the system, as an optimum program for converting from the initial to the final state considered. The said shortest connecting sequence or route will be picked out by the memory device even though that sequence may not actually have occurred in full, from end to end, during the earlier operation of the machine, in which case the memory device will spontaneously build up said shortest sequence from appropriate bits and pieces of longer sequences that have effectively occurred.

The extraction of the shortest sequence or route between two given states is but one example of the numerous capabilities of the apparatus of the invention. The versatility of the apparatus is very great and a complete listing of the types or modes of operation of which it is capable cannot be given; a few further examples however may be indicated.

Given two states (or sets of states, in case more than one interconnected matrices are used as will be later described), it is possible to extract, i.e. pick out and display, all of the causal sequences or routes interconnecting them no matter how long, how intricate and how numerous such routes, and to do so within a relatively short time, i.e. with a relatively small number of electronic switching operations. It is possible, again with a limited number of switching operations, to extract all of the elementary data that were presented for storage in said memory at the same or approximately the same time. Similarly, it is possible to extract the complete sequence of steps by which one such global information array was, or can be, converted to another such array in the system with which the memory is associated, and to identify and display each of the intermediate states constituting each said step; or alternatively to extract the shortest sequence of steps required to convert said first into said second array; or to extract only that sequence or those sequences which includes or include one or more prescribed global information arrays, or again only that sequence or those sequences which does not or do not include one or more prescribed arrays; or to extract only that sequence or those sequences satisfying a prescribed combination of the conditions specified above.

In addition to the strictly logical modes of operation of which the above provide examples, it has been an object of the invention to provide a device capable of other modes of operation that may be regarded as evading pure logic in that they depend in part on hypothetical and/or random configurations and which are thereby able to some extent to simulate such elusive faculties of the human mind as imagination and intuition. For example, it can happen that causal sequences stored in different matrices of a composite memory system according to the invention may partly overlap in such a manner as to create an over-all sequence which, even though it did not actually take place during the operation of the system, is treated by the memory device as if it did occur, so that it may be extracted and displayed and thus provide an entirely new sequence of steps that may be fruitfully utilized in subsequent programming and which would have remained unrevealed had it not been "discovered" by the apparatus. It is, accordingly, an object of this invention to provide a memory system possessing novel types of creative faculty.

An exemplary embodiment of the invention will now be described for purposes of illustration but not of limitation with reference to the accompanying drawings, wherein:

FIGS. 1, 1A and 1B are complementary portions of a circuit diagram, drawn up partly in terms of logical information flow and partly in terms of electric current flow, of one section of a memory system according to the invention, including a so-called storage center, a related state-association center and action-association center connected therewith, information extraction circuits and other relevant equipment;

FIGS. 2 and 2A are complementary portions of a simplified logical circuit diagram of a complete memory system according to the invention including four storage centers of the type shown in greater detail in FIG. 1;

Figure 4:
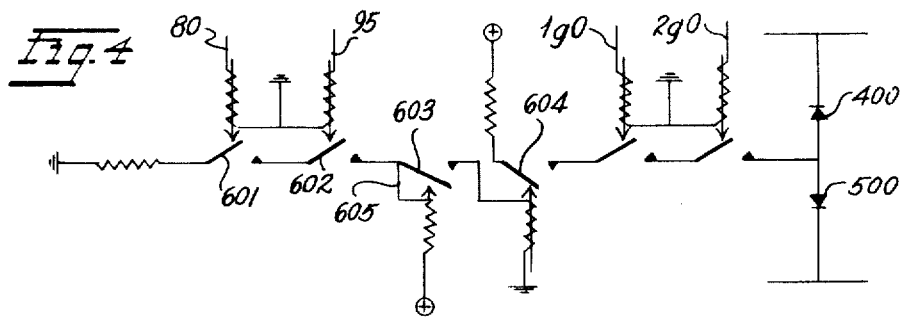
Figure 5:
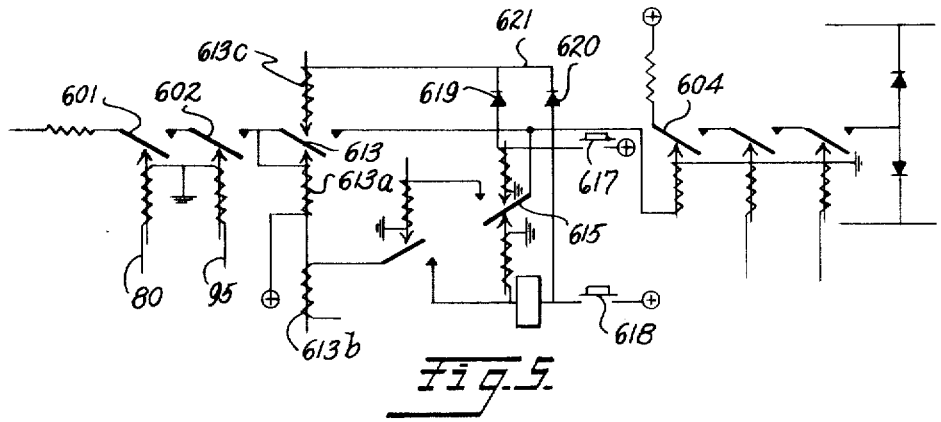
Figure 6:
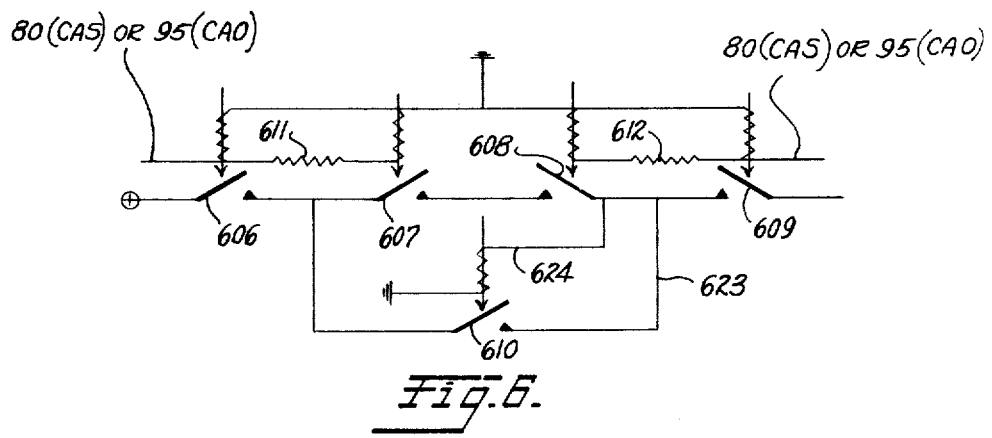

FIGS. 4, 5 and 6 are simplified electric circuit diagrams of three basic circuits usable in the memory system of the invention; FIG. 4 shows one of the sixty-four three-input circuits constituting the settable storage elements in the storage center shown in FIG. 1; FIG. 5 shows an alternative form therefor; and FIG. 6 shows one of the settable storage elements used in each of the state-association and action-association centers shown in FIG. 1.

Before proceeding with the description of the illustrated embodiment, a few basic remarks and definitions will be given.

*Preliminary remarks and definitions*

Any data-processing or computing system utilizes external information from the system's surrounding "universe," such as data introduced by a human operator and/or delivered from automatic sensing means or the like, as well as internal information (e.g. intermediate computation results). It will be assumed that both types of information are available in the form of digital electric signals serially applied by way of sets of "state input" lines. The signals simultaneously applied at a given time constitute sets of data which have earlier been termed global information arrays, and will hereinafter be referred to as "complex states" of the system.

Further, a system with which the memory of the invention is used may comprise a set of operator members which may operate simultaneously and serially. A number of such operators acting simultaneously at any given instant are said to effect a "complex action." The number of such complex actions that may be effected is equal to the number of possible combinations between the simultaneously operable operator members of the system, i.e. the number of possible operator settings or adjustments. It is here assumed that each action of an operator of the system with which the memory of the invention is used produces an item of information in the form of a (e.g. two-valued) digital electric signal applied to the memory by way of an action input line. Thus, the input to the memory of the invention comprises a set of "state inputs" and a set of "action inputs." The successive application of simultaneous combinations of state signals and of action signals to the respective sets of memory inputs constitutes a complete, progressive description of the history of the system with which the memory is associated, as said history unfolds.

The particular state of the system at any time is derived from the system's state at a preceding time as the result of the action applied to that state. This may be expressed by saying that an action $a$ applied to an initial state $Sd$ causes a resultant state $Sr$.

Figure 1:
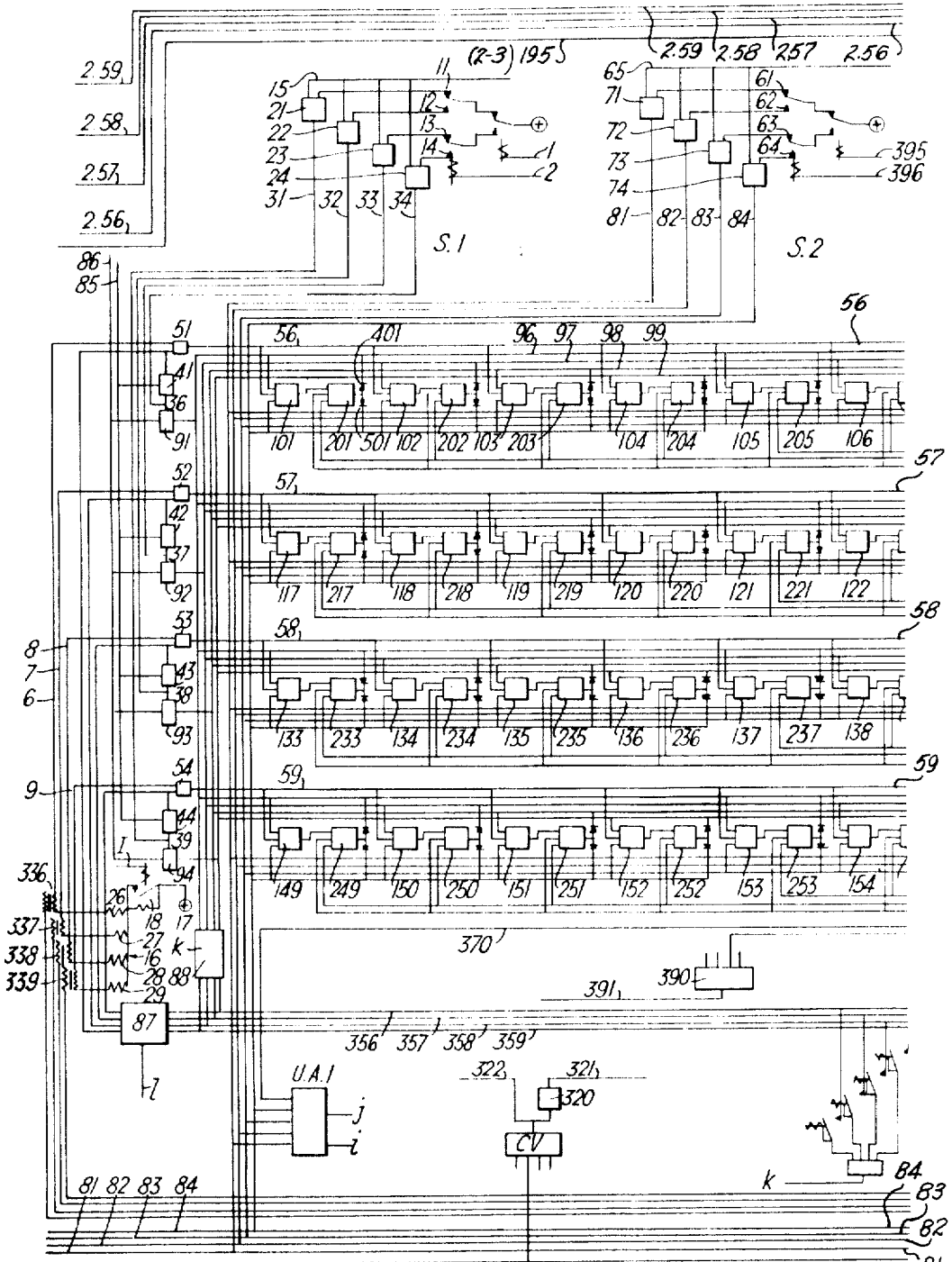
Figure 2:
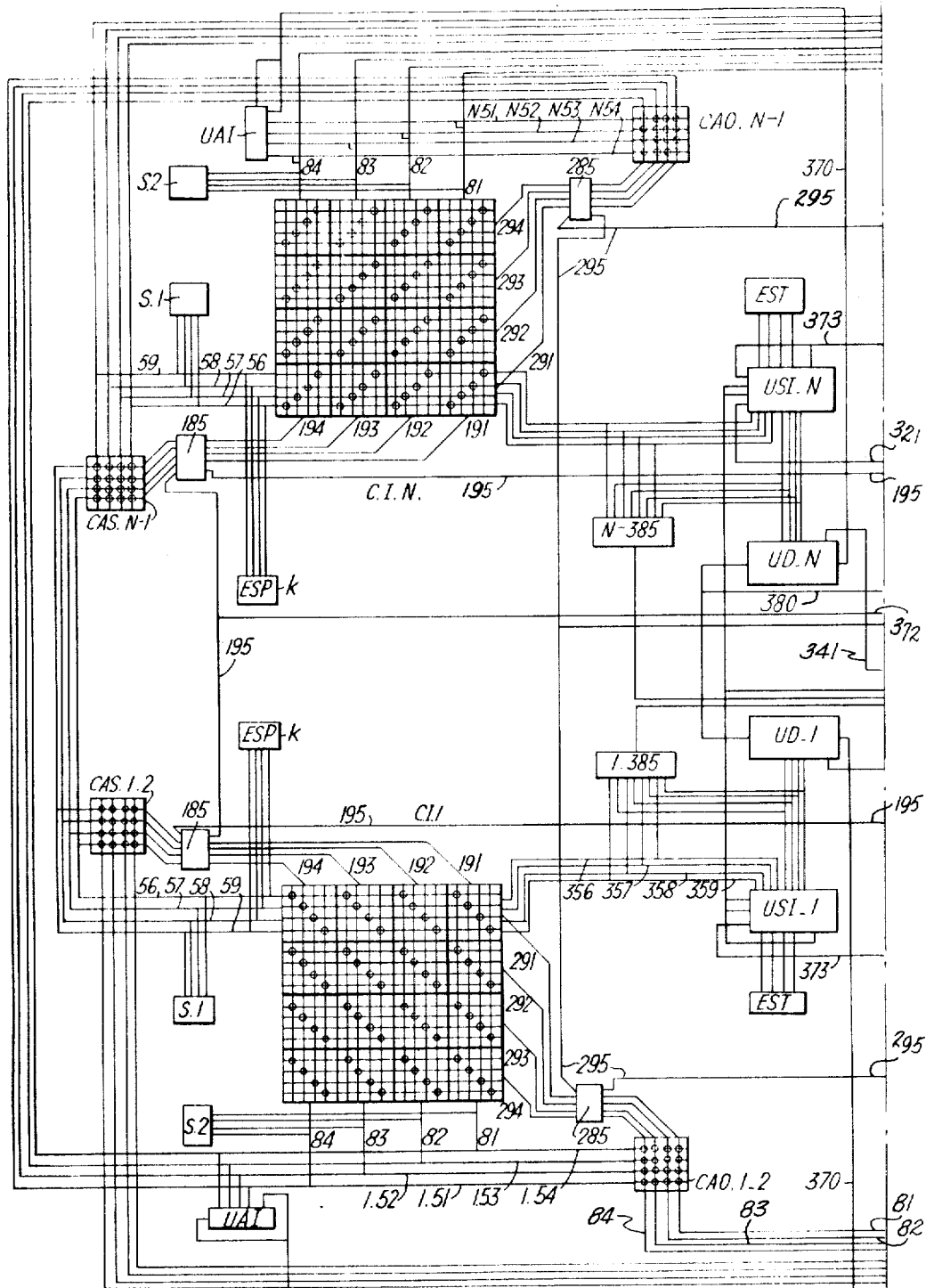

The memory of the invention basically includes a so-called storage center designated CI and composed of a number of settable storage elements connected in a matrix array. One such storage unit CI2 is shown in FIG. 1. As will later appear, in the preferred embodiment of the invention, the memory comprises a number of such storage centers interconnected together such as the four storage centers CI–1, CI–2, CI–3, CI–N, interconnected in a ring pattern as shown in FIG. 2. Each storage center, e.g. CI–2 FIG. 1, has information-input mean for applying thereto the signals representing both the successive states, and the successive actions, of the system with which the memory is used. Usually, in a memory comprising a number of storage centers, each center would receive information pertaining to a certain type of state and a certain corresponding type of action of the system. This is not essential however, and in certain systems of a highly differentiated character it may be of interest to direct certain information smultaneously to more than one storage center, and/or substitute certain types of information by other types in a center.

Bearing in mind the definitions of "states" and "actions" given above with reference to the operation of a system with which the memory is associated, the following more specific definitions, as applied to the memory device itself, will be readily understood.

An "Elementary State" $Se$ is defined as a set of information signals pertaining to a state of the system, as stored at any time in a storage center CI.

An "Elementary Action" $a$ designates a set of information signals pertaining to an action of the operator members of the systems as stored at any time in a storage center CI.

A "Complex State" $Sc$ designates the set of elementary states $Se$ simultaneously present, at any time, in all the storage centers CI of a memory composed of more than one storage centers.

A "Complex Action" $ac$ similarly designates the set of elementary actions $a$ simultaneously present in all the storage centers of the memory. A complex action $ac$, when applied to an initial complex state $Scd$, produces a resultant complex state $Scr$, just as an elementary action $a$, when applied to an initial elementary state $Sed$, produces a resultant elementary state $Ser$.

I define as an "Elementary Act" A (not to be confused with an elementary action $a$) the elementary causal sequence or relationship comprising an Initial Elementary State, an Elementary Action, and a Resultant Elementary State.

A "Complex Act" $Ac$ is defined as the set of all simultaneous elementary acts A occurring in the system and applied as signals to all of the storage centers of the memory. A complex act constitutes a unitary step in the particular operating process of any system. The whole operating history of the system is but a sequence of complex acts, wherein the resultant complex state of one act constitutes the initial complex state of the next act.

*Conventions used in the description and drawings*

Certain logical circuits used in the invention, and notably the three-input settable circuits constituting the storage elements of the memory matrix and others, are herein shown and described as comprising electromechanical relays. This is for convenience of description only, and it should be expressly understood that, in the actual construction of the improved memory system, electronic circuitry would preferably be used throughout. The circuitry may include electron tubes, transistors, ferrite cores, magnetic films, cryogenic elements, and/or any of the other types of electronic equipment well-known to those familar with present-day data processing techniques. Conversion of the electromechanical circuitry shown and described to functionally equivalent electronic circuitry of the selected type will be easily effected by those familiar with the art.

The following further convention is used for convenience. Circuit elements having similar functions are referred to in the description by a type number which however is not used to designate any of those elements in the drawings; instead, such elements are designated in the drawings by reference numerals the lowest one of which is one higher than the type number. Thus, the four information input lines referred to in the description as "type-30 lines" or "lines 30" are actually designated in the drawings by the reference numerals 31, 32, 33 and 34.

*Storage center—general description*

As shown in FIG. 1, a storage center CI constituting the basic unit of the improved memory system comprises a set of herein sixty-four storage elements connected in a three-dimensional matrix. Each storage element is shown in the form of two serially connected blocks, types 100 and 200 respectively, which will be later described in detail with reference to FIG. 4. As will appear later, the type-200 circuits (so-called "enabling" circuits) serve primarily to correlate the operation of the storage center CI–2 described with that of other storage centers of the memory, and they may be omitted in the basic form of the invention where a single storage center is used. Thus, the basic storage elements of the memory matrix are provided by the type-100 circuits each of which may be regarded as a three-input AND-circuit combined with a two-state binary element or flip-flop which is settable to its 1-state by the simultaneous application of signals to the three inputs. The three inputs to each type-100 circuit respectively serve to apply an Initial State ($Sd$) signal derived from a type-55 line (i.e. one of four lines 56, 57, 58, 59), a Resulting State ($Sr$) signal from a type-95 line (one of four lines 96, 97, 98, 99), and an Action ($a$) signal from a type-80 line (one of four lines 81, 82, 83, 84).

In the example described, it is assumed that the storage center CI is able to receive from the associated system signals representing four different system states, and signals representing four different system actions. This small number of states and actions is, of course, used for convenience of illustration only, and in practice the number of state signals and action signals applicable to a storage center of the invention would usually be much greater. Since each type-100 circuit or storage element of the center, when set to its 1-state, must represent a particular combination of one of four possible initial states with one of four possible actions and with one of four possible resulting states, it is immediately seen that, with the exemplary numbers of states and actions just specified, the total number of storage elements in the center must be $4 \times 4 \times 4 = 64$ in order to be capable of catering for all the possible ternary combinations of initial and resulting states and actions.

For applying to the storage center "state input" signals, including both the initial and resulting state signals through lines 55 and lines 95, there is here shown a state selector unit S1, and for applying the action signals through lines 80 there is shown an action selector unit S2. State selector S1 is shown as comprising two relays the energization of which is controlled by voltage signals applied to the input lines 1 and 2. The relays operate one and two reversing switches respectively, connected in a conventional scale of two switching circuits with a voltage source and with four type-10 lines, so that depending on the particular binary combination of signals present on input lines 1 and 2, a particular one of the type-10 lines is energized. The type-10 lines each form one input to a related two-input AND-circuit, type 20, the other input to all of which is provided by a common line 15 supplying a timing pulse $a$ derived from a control or synchronizing unit H schematically shown at the top of FIG. 1. The outputs from the type-20 AND-circuits are the four type- 30 lines which are connected to the type-55 lines constituting the initial-state inputs to the storage elements and the type-95 lines constituting the resulting-state inputs to the storage elements through means later described.

The construction of the action-selector S2 is identical to that of the state-selector S1, it including four type-70 AND-circuits having as one of their inputs a line 65 supplying a synchronizing pulse $e$ from control unit H, and as their other input one of four type-60 lines, a particular one of which is energized depending on the binary combination of signals present on input lines 395 and 396. The four outputs, type-80, from the type-70 AND-circuits are directly applied as the action inputs to the storage elements of the matrix.

It is noted that each of the selectors S1 and S2 has been described as including two binary switching elements (symbolically indicated as electromechanical relays), because as earlier stated the storage center here shown is only capable of receiving four state signals and four action signals. In the broad case where provision is made for $2^S$ state signals and $2^A$ action signals, the number of binary elements (e.g. relays) in selectors S$o$ and S$d$ would be S and A respectively. Furthermore, the total number of storage elements in the storage center, i.e. the total number of type-100 circuits, or of paired type 100-type 200 circuits, would then be $2^S \times 2^S \times 2^A$ or $2^{2S+A}$. In the illustrated instance, we have $S=A=2$ so that the total number of storage elements is 64 as already noted.

Whereas the four type-80 output lines of action-selector S2 are directly and exclusively connected to the action inputs of the type-100 storage circuits as mentioned above, the four type-30 output lines of state-selector S1 are required to be connected separately to the initial-state inputs and the resulting-state inputs of the type-100 circuits, as will be understood from earlier explanations, in order to enable separate entry of an initial-state signal and a resulting-state signal for each of said circuits. Accordingly, each type-30 line from state selector S1 is connected by way of a type-35 line to one input of a related type-40 AND-circuit and to one input of a related type-90 AND-circuit. The type-40 AND-circuits have their second inputs connected to a common line 85 adapted to receive an initial-state recording signal $b$ from the control unit H; and the type-90 AND-circuits have their second inputs connected to a common line 86 adapted to receive a resulting-state recording signal $c$ from unit H. The outputs of the type-40 AND-circuits are connected through type-50 gate circuits, the function of which will appear later, to respectively related type-55 lines, which are the initial-state input lines; and the outputs of the type-90 AND-circuits are directly connected to the respectively related type-95 lines, the resulting-state input lines.

It has been stated that the multiplicity of storage elements of the storage center of the invention are connected in a three-dimensional array or matrix. In the embodiment shown in FIG. 1, this is achieved in the following way. Consider the sixty-four type-100 circuits of the center as distributed in three different manners or groupings, with each of the three groupings (each comprising all 64 circuits) being subdivided into four groups of sixteen circuits each, to wit:

First grouping (to receive the S$d$ inputs):
    1st group: Circuits 101 through 116;
    2nd group: Circuits 117 through 132;
    3rd group: Circuits 133 through 148;
    4th group: Circuits 149 through 164.

Second grouping (to receive the $a$ inputs):
    1st group: Circuits 101–104, 117–120, 133–136 and 149–152;
    2nd group: Circuits 105–108, 121–124, 137–140 and 153–156;
    3rd group: Circuits 109–112, 125–128, 141–144 and 157–160;
    4th group: Circuits 113–116, 129–132, 145–148 and 161–164.

Third grouping (to receive S$r$ inputs):
    1st group: All circuits occupying *first* place in each of the 16 sub-groups of four listed under the second grouping, i.e. circuits 101, 117, 133, 149, 105, 121, 137, 153, 109, 125, 141, 157, 113, 129, 145 and 161;
    2nd group: All circuits occupying *second* place in each of the said 16 sub-groups, i.e. circuits 102, 118, . . . 162;
    3rd group: All circuits occupying *third* place in each of said 16 sub-groups, i.e. circuits 103, 119, . . . 163;
    4th group: All circuits occupying fourth place in each of said sub-groups, i.e. circuits 104, 120, . . . 164.

It will be recognized that the three distinct groupings correspond to the respective dimensions of a three-dimensional array or matrix. All the type-100 circuits of each of the four groups in the first grouping are connected in parallel to a respectively related one of the four type-55 (initial-state input) lines, i.e. line 56 connects with all the 100-type circuits of the 1st group 101 through 116, line 57 with the circuits of the 2nd group 117 through 132, and so on. All the type-100 circuits of each of the four groups of the second grouping are connected in parallel to a respectively related one of the four type-80 (action input) lines, i.e. line 81 connects with all the circuits of the 1st group, line 82 with all the circuits of the 2nd group, and so on; and lastly all the type-100 circuits of each of the four groups of the third grouping are connected in parallel to a respectively related one of the four type-95 (resulting-state input) lines, i.e. line 96 connects with all the circuits of the 1st group, line 97 with all those of the 2nd group, and so on.

Information input

Figure 3:
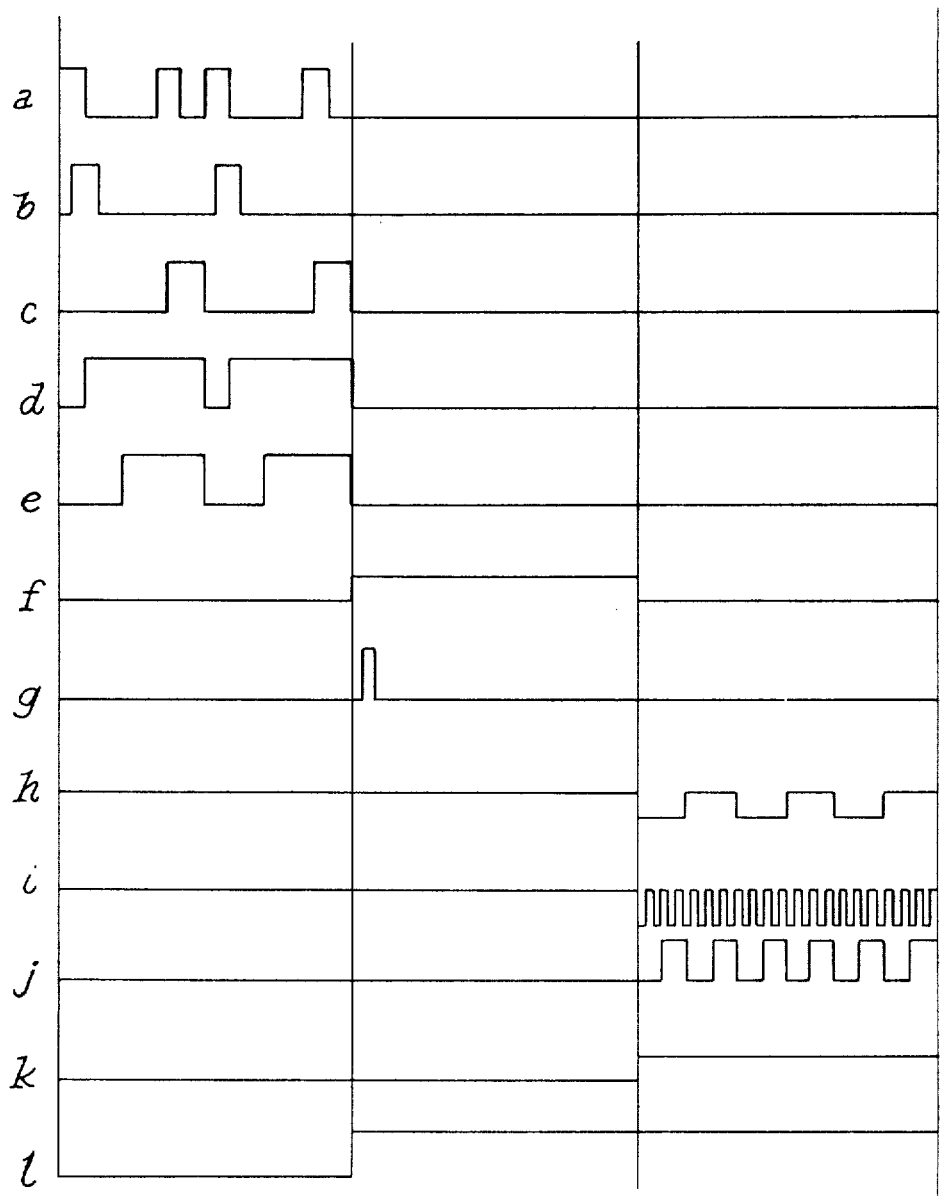
FIG. 3 is a timing chart illustrating the waveforms of various synchronizing or control pulses occurring throughout the system, the three columns of the chart respectively relating, from left to right, to an information-input cycle, and the first and second stages of an information-extracting cycle.

The process of entering information into the storage center of the invention will now be described in detail. In the chart of FIG. 3, where the abscissae represent time and the ordinates voltages, the first left-hand column relates to the information-entering cycle or operating mode, and it will be seen that during this period the control and synchronizing unit H transmits five different types of timing or control pulses, $a$, $b$, $c$, $d$, and $e$, over five different lines; all said five pulses except pulse $d$ have been referred to earlier. At a given stage of system operation, one of the four type-10 lines of state-selector S1 is energized, manifesting a particular elementary state of the system. On occurrence of state-input pulse $a$ from unit H on line 15, the (preferably D.-C.) voltage present on the energized type-10 line is transferred through the related type-20 AND-circuit to a corresponding one of the type-30 lines. The elementary system state represented by the energized type-30 line is to be applied to the proper type-100 circuits through the type-55 lines as an initial state S$d$, and is to be applied to the proper type-100 circuits through the type-95 lines as a resulting state S$r$. To ensure this, the voltage present on a type-30 line is only transferred to the related type-95 (S$r$) line through a type-90 AND-circuit having its other input connected to a line 86 receiving the resulting-state-input timing pulse $c$ from control and synchronizing unit H. As shown in FIG. 3, the relative timing between pulses $c$ and $a$ is such that the elementary system state as entered on state selector S1 is only transferred to the type-100 circuits as a resulting state over S$r$-input lines type 95, on occurrence of 2nd and 4th pulses $a$, and the energizing of the type-95 line is maintained the duration of timing pulse $c$. The elementary system state represented by energization of a type-30 line is also applied to the input of a type-40 circuit. Each type-40 circuit actually consists (although this has not been shown for clarity) of a pair of series-cascaded AND-circuits, (or an AND-circuit-and flipflop combination), the first of which has as one input a type-35 line connected to a type-30 line, and as its other input the common line 85 to which a timing pulse *b* is applied, and the second of which has as one input the output of said first AND-circuit and as its other input a common line (not shown) to which a timing pulse *d* is applied from unit H. The second AND-circuit is adapted, when triggered by the first AND-circuit, to maintain an output for the duration of the *d* pulse. The output from the second AND-circuit of the pair shown as type-40 is applied to type-50 gate circuit, which has an input connected by a type-5 line, a type-25 resistor and a primary winding of a type-335 sensing transformer, later described, to a D.-C. voltage source 17. The output of type-50 gate is connected to a related one of the four type-55 lines constituting the initial-state (S*d*) inputs of the type-100 circuits. Thus, throughout the duration of pulse *d*, the positive voltage from source 17 is applied to the particular type-55 line selected by state selector S1 on occurrence of the preceding *a* pulse as an initial-state (S*d*) input signal for the related type-100 circuits. As will appear from the chart of FIG. 3, the arrangement is such as to preclude the simultaneous transfer of an energized condition present on a type-30 line, and representing an elementary system state, through both a type-40 circuit and a type-90 circuit so as to energize both the initial-state (S*d*) inputs and the resulting state (S*r*) inputs of the type-100 storage circuits.

Meanwhile, a system action entered by way of action selector S2 on occurrence of action-entering timing pulse *e* (line 65), is manifested as a voltage upon one of the type-80 lines, and this voltage is transferred directly to the action-inputs of the appropriate type-100 circuits.

The simultaneous application of a voltage to one of the four type-55 (initial-state input or S*d*) lines, a voltage to one of the four type-80 (action input or *a*) lines, and a voltage to one of the four 95 (resulting-state input or S*r*) lines acts to set one, and only one, of the sixty-four type-100 circuits, or storage elements. The storage center CI has thus registered and stored an act, or unit causal relation, of the system's operation, consisting of an initial state S*d*, an action *a* a resulting state S*r*, as the setting of a particular storage element (type-100 circuit) in the storage center.

It will be understood that the primary function of the timing pulses *b*, *c*, *d*, and *e*, is to ensure that the three respective types of information signals, initial state S*d*, action *a* and resulting state S*r*, are all applied simultaneously to the appropriate type-100 circuit, even though the three events represented by those signals are actually spread apart or displaced in time. Simultaneous application of the three signals is, of course, necessary to set or trip the type-100 circuits. As to timing pulse *a*, this primarily serves to regularize the entry of information into the storage center and avoid overlap between information signals. In many cases, the *a* timing pulses may be omitted. Further, in cases where the inherent operation of the system with which the memory is used is such that the changes in setting of the state-selector S1 occur at unpredictable times, as may well happen, *a*-pulses of very short duration may be used, and the type-20 circuits of the state selector may be constructed in a well-known manner to be capable of maintaining an output signal on energization of the related type-10 input line from the time of occurrence of the *a*-pulse to somewhat beyond the beginning of the *d*-pulse.

Further in connection with the timing pulses, it may be noted that the duration of these pulses is preferably pre-adjusted into harmony with the particular operating speed or rhythm of the machine or system with which the memory of the invention is used. In other words, the pulse duration should correspond to the actual rate at which successive system states are converted each into the next under the effect of the successive actions. Desirably though not necessarily, the timing pulse durations are made controllable, and the control may desirably be exerted by the system itself. Thus, in FIG. 1, line 16 connected with the synchronizer and control unit H symbolically indicates a pulse control line which may be energized from the operator members of the machine or system on completion of an action or state-conversion step. Other suitable types of automatic timing pulse duration and/or rate control are conceivable. Advantageously, such control would be coupled with means for automatically switching the memory from the information-input mode of operation to the information-extraction mode (later described) during idle periods of the system operation.

A clearer grasp of the operation of the memory storage center described with reference to FIG. 1 in storing information may be gained by considering the following table, which illustrates an exemplary sequence of assumed operating steps or acts of a system and the manner in which the storage center CI of FIG. 1 responds thereto.

The table is discussed in detail below.

| Act No | 1 | 2 | 3 | 4 | 5 | 6 |
|---|---|---|---|---|---|---|
| S*d* | 0 | 3 | 1 | 2 | 1 | 0 |
| *a* | 1 | 0 | 2 | 3 | 1 | 3 |
| S*r* | 3 | 1 | 2 | 1 | 0 | 2 |
| Input lines energized | 56.83.99 | 59.81.97 | 57.83.98 | 58.84.97 | 57.82.96 | 56.84.98 |
| Storage element set | 112 | 162 | 123 | 134 | 125 | 103 |

The table shows six unit steps or acts, numbered 1 through 6, of an exemplary operating sequence of a system with which the storage center CI of FIG. 1 is used. Each step is defined as the ternary combination of a certain initial state S*d* (2nd line of the table) a certain action *a* (3rd line) and a certain resulting state S*r* (4th line). There are four possible (initial or resulting) states as determined by the four possible settings of state selector S1 and these four states are numbered 0 through 3. Similarly, there are four possible actions as determined by the four settings of action selector S2 and these four actions are numbered 0 through 3. The arrows point to the fact that the initial state of each act is the same as the resulting state of the preceding act. In the fifth lines are indicated, for each act, the particular combination of input lines, types 55, 80 and 95 respectively, that are energized. In this respect, it is arbitrarily assumed that initial state S*d*=0 causes energization of type-55 input line 56, initial state 1 causes energization of line 57, initial state 2 energizes line 58 and initial state 3 energizes line 59, and a similar scheme is used for the action input lines type-80 and the resulting state input lines type-95. The bottom line of the table indicates the particular storage element, or type-100 circuit, that is set or tripped due to the particular combination of input lines energized. Thus, in set No. 1, since we have initial state S*d*=0, action *a*=1 and resulting state $Sr=3$, lines 56, 82 and 99 are simultaneously energized. Tracing these lines in FIG. 1, it is seen that the only one of the 64 type-100 circuits to receive these three lines at its respective inputs is circuit 112; hence circuit 112 and only circuit 112 is set, and so on through the sequence. It may be noted at this point that the type-100 circuits are so constructed, as later described, that once such a circuit has been set (e.g. to its "1-condition") by the simultaneous application of signals to its three inputs, subsequent application of signals to its three inputs will not change the condition of the circuit.

The mechanism by which the memory of the invention works to register and store successive causal steps or acts of an operating sequence, each act being uniquely defined by an initial state, an action and a resultant state, should now be clear. An important feature to be noted is that the setting of each binary storage element of the memory represents a considerably greater amount of information than is the case with settable binary storage elements in conventional memory systems. The whole amount of information thus stored in each storage element is made immediately available on interrogating or testing the storage center through the information extracting means to be later described. Briefly, it may here be indicated that the setting of each type-100 circuit serves to complete a particular conductive circuit path for testing voltage signals transmitted by the information-extracting means through the type-55 lines. By scanning the paths thus completed through a selective actuation of the extracting means, as later described in detail, any desired type of information relating to the states, actions and acts recorded in the storage center at the time of interrogation can be extracted.

State-and action-association centers

A memory system comprising a single storage center CI as so far described with reference to FIG. 1 is fully operative and constitutes per se a basic aspect of the invention. According to a preferred aspect, however, the improved system comprises a plurality of such storage centers interconnected with one another through the agency of so-called association centers in a manner to be described. Such a provision not only reduces the amount of equipment, specifically the number of individual storage elements that is required in order to cater for a given number of different states and actions liable to be applied to the memory, but also very greatly increases the flexibility and versatility of operation of the memory.

Thus, FIG. 2 illustrates a memory system comprising four storage centers CI-1, CI-2, CI-3 and CI-N each similar to the storage center of FIG. 1, and interconnected in an over-all ring pattern through intermediate state association centers CAS and action association centers CAO. Because the storage centers CI form a closed loop, the state association centers CAS, and the action association centers CAO, are in this case each equal in number to the storage centers CI. Each association center is identified by the numeral designations of the two storage centers it serves to connect. Thus, the state and action association centers serving to interconnect or to correlate the storage centers CI-1 and CI-2 are identified as CAS 1-2 and CAO 1-2 respectively. FIG. 1 shows in greater detail the storage center CI-2 together with the association centers CAS 2-3 and CAO 2-3.

The basic function of a state (or action) association center is to memorize the simultaneous application to both storage centers associated therethrough, of each of the possible combinations of state (or action) input signals, that has occurred, and, on the subsequent extraction of information from a storage center, to enable the response of a storage element only if the information extraction (or testing) signal specifies a combination of state and action signals that has effectively previously occurred (i.e. been simultaneously applied) to both storage centers as memorized by the settings of the association centers. For this purpose, the storage elements of each storage center each includes, in addition to the type-100 circuits, also a so-called "enabling" circuit, type 200, as shown in FIG. 1. As will be later described in detail, each type-200 enabling circuit has one input connected to the output of the related type-100 circuit and two further inputs, respectively fed from the state-and action association centers CAS and CAO, so that the information content of a type-100 circuit can only be effectively passed to the output if this is "authorized" by the association centers.

It should be understood that the ring-type connecting pattern of storage and association centers illustrated in FIG. 2 and described herein is only exemplary. Depending on the manner of operation of the system to which the memory of the invention is to be applied, various other interconnecting patterns may be used, including branch-chain or arborescent patterns, network patterns, and the like. In selecting the particular interconnection scheme giving best results for each particular application, the basic problem is to determine the number of storage centers CI between which a given number of state and action information signals, as determined by the system considered, are to be distributed. It is noted however that the basic scheme involving the interconnection of two and only two storage centers CI through a state association center CAS and an action association center CAO, and more specifically the closed ring pattern with the storage and association centers alternating, as here shown, appears in most cases to afford maximum advantages for minimum equipment.

In the description to follow, the same reference numbers are used to designate corresponding components associated with the various storage centers CI of the memory system. When necessary for clarity, the reference numeral designating the component is preceded or followed by a numeral identifying the storage center to which the component relates. The description will proceed with reference to four storage centers connected in a ring pattern as shown in FIG. 2, but clearly the number of storage centers thus connected may be reduced or increased, and, to emphasize this, the fourth storage center in FIG. 2 is identified as CI-N. As in the disclosure so far made, it is assumed that each storage center is arranged to receive four different state signals and four different action signals, and thus includes sixty-four storage elements. In FIG. 2, the storage centers are only very schematically indicated, with each storage element (a type-100—type-200 circuit combination) being indicated as a small circle.

Returning to the construction of the association centers, it will be seen from FIG. 1 that a state association center such as CAS 2-3 comprises a square matrix of sixteen settable two-input binary storage elements, type 165, to be later described in detail. Each of the four type-55 lines relating to storage center CI-2 is connected to each of the four type-55 lines relating to storage center CI-3 by way of four of the said type-165 circuits of state association center CAS 2-3. Thus, each of the type-2-55 lines (i.e. the type-55 lines relating to storage center CI-2) is connected in parallel to the one inputs of four type-165 circuits disposed in a vertical bank, or column, and each of the type-3-55 lines is connected in parallel to the second inputs of four type-165 circuits disposed in a horizontal bank or row. Thus, on simultaneous occurrence of an initial state (Sd) signal on any one of the type-55 lines for storage center CI-2 and of an initial-state signal on any one of the type-55 lines for storage center CI-3, a single one of the 16 type-165 circuits of state association center CAS 2-3 is set, i.e. swtiched to a conductive condition. The outputs of the four type-165 circuits in each column are connected in parallel to one input of a related AND-circuit, type 185, switched to a conductive condition. The outputs of the type-185 AND-circuit is connected by a type-190 line in parallel to the "state-enabling" inputs of all the type-200 circuits forming a related group of the first grouping, as earlier defined. Thus, on subsequent application, during an information extracting cycle, of testing signals simultaneously over a type-2–55 line and a type-3–55 line, the particular type-165 circuit with which both the energized type-55 lines connect will only allow the signal voltages to pass to a type-185 AND-circuit and thence (assuming the second input of this latter is energized) to a state-enabling input of an appropriate type-200 circuit, if that type-165 circuit was previously set to conductive condition by the same combination of type-2–55 and type-3–55 signals during a previous information-input period.

The construction of action association center CAO 2–3 is exactly comparable to that of CAS 2–3, it being a square matrix of sixteen settable storage elements, type 265, serving to interconnect each of the action-input type-80 lines of CI-2 with each of the type-80 lines of CI-3. On simultaneous occurrence of an action (a) signal on any one of the type-2–80 lines and of an action signal on any one of the type-3–80 lines, a single one of type-265 circuits is set, i.e. switched to a conductive condition. On subsequent application of testing signals simultaneously over a type-2–80 line and a type-3–80 line, the particular type-265 circuit with which both energized lines connect will only allow the combined signal voltages to pass to a type-285 AND-circuit and thence (assuming a second input of this latter is energized) to an action-enabling input of an appropriate type-200 circuit, if that type-265 circuit was previously set to conductive condition by the same combination of type-2–80 and type-3–80 signals during a previous information-input period.

As shown in FIG. 1, the output of each type-200 circuit in the storage center is applied through a type-400 (and a type-500) diode to the particular type-95 (and type-80) line to which the $S_r$-input (and the $a$-input) of the related type-100 circuit is connected. Thus a testing signal voltage can only pass through a given combination of type-100—type-200 circuits if (1) the type-100 circuit was previously set, and (2) there are applied to the type-200 circuit, simultaneously with the testing signal, two enabling signals over type-190 and type-290 lines from the association centers CAS and CAO.

The outputs from all four type-185 AND-circuits are applied to the four inputs of an OR-circuit 196 which delivers its output to a common output line 2,3–195; similarly, the outputs from all four type-285 AND- circuits are applied to the inputs of an OR-circuit 296, which delivers to a common output line 2,3–295. Each OR-circuit 196, 296 has an additional input through which a timing pulse $g$ is applied during the first extraction period as will presently appear. As mentioned above, each of the type-186 AND-circuits and type-296 AND-circuits has a second input. The common second input to the type-185 circuits is the line 2,4–195 which constitutes the common output line from state association center CAS 3–4 of the next higher order (not shown in FIG. 1); and the common second input to the type-285 circuits is the line 3,4–395 which is the common output line from action association center CAO 3–4 of next higher order. With a similar arrangement being provided for all the association centers of the ring memory array, as indicated in FIG. 2, it will be seen that, in the particular embodiment shown, it is necessary that an information-extracting, or testing, signal should be passed through all the association centers in order that a type-100—type-200 circuit combination of any storage center shall be able, if the type-100 circuit is set, to complete a conductive path therethrough for the testing signal and thus vouchsafe information as to the set condition of the type-100 circuit. In addition, it is necessary to initiate or "prime" the flow of output information by applying to all the OR-circuits 196 and 296 the $g$ pulse, (see FIG. 3), which momentarily energizes the two enabling inputs of all type-200 circuits of all storage centers, as will presently appear. With the output information flow thus primed, and on cessation of the $g$ pulse, the circuit paths now completed through the type-100—type-200 circuit combinations that are being tested in the various storage centers CI by the application of testing signals through the association centers CA will only be maintained in the event that the type-165 and type-265 circuits corresponding to the testing signals have previously been set in all of the state and action association centers CAS and CAO in order to energize all of the common output lines 195 and 295. Otherwise, the outputs from the tested type-100 circuits will be blocked by the related type-200 circuits on cessation of the $g$ pulse and the related information will not be extracted. In the extraction of data describing complex acts of the system, the provision just referred to constitutes a check of whether any set of elementary acts designated by the testing signals applied to the respective storage centers at any data-extracting step does in fact constitute a previous complex act of the system, already stored in the memory, rather than a mere random aggregate of elementary acts. In the extraction of data relating to sequences of complex acts, this check by means of the $g$ pulse is effected at each successive extracting step, in a preliminary period of the extraction cycle.

*Intuition*

At this point, a remarkable property of the memory system of the invention may be mentioned. The property is based on the fact that the checking procedure just described is not 100% reliable. Where a series of elementary acts stored in adjacent storage centers CI have coexisted while other elementary acts stored in other adjacent storage centers have also coexisted together but at some other time, then should the two series of acts present an appropriate topological relationshtip, specifically should both series possess non-contiguous acts in common, the combined aggregate of both series of elementary acts will be treated by the memory of the invention as a true complex act of the system, previously recorded in the memory. In other words, a set of testing signals corresponding to such an aggregate of elementary acts, when applied to the memory association centers, will result in the corresponding type-200 circuits being enabled in the storage centers and hence permit extraction of the corresponding information from the type-100 circuits. A similar situation may of course arise with more than two series of elementary acts, should each series be continuous, i.e. involve adjacent storage centers, and should the series have non-contiguous acts in common. In all such cases, the memory may be said to have "imagined" a non-existent complex act of the system, i.e. one of the system has yet actually performed. This can lead to either of two possibilities.

The aggregate of elementary acts erroneously treated by the memory as a complex act may be a chance occurrence having no fundamental relationship with the experience of the memory, i.e. the operating history of the system, and hence not based on any effective resulting complex state. During the extraction of a sequence of complex acts interconnected by casual relationships or steps which is the normal form of use of the memory system herein described, such aggregates will be eliminated of their own accord as "logical monstrosities" because the data-extracting procedure will be blocked within a comparatively short time as a result of the checking procedure effected by the association centers in subsequent steps. There is another possibility however, which though much more infrequent is considerably more productive in its results. A configuration of the type referred to above as constituting a pseudo-complex act may lead ultimately back to a true complex state, indicating a significant likelihood that the configuration, even though not yet actually experienced by the system, is consistent with the laws governing the system's universe. Such a configuration whenever encountered should be carefully analysed since there is a good chance of its representing an ordered, logical pattern of activity valuable in subsequent system programming operations.

In such cases, the memory is seen to have produced a novel and potentially useful programming pattern by a not-wholly-logical process which, herein, is termed "intuition" by analogy with the human thought process of that name, and to distinguish it from another possible type of non-logical behaviour of the memory, later referred to as "imagination."

It should be understood that the occurrence of data configurations treated as pseudo-complex acts by the memory of the invention is, on the whole, very rare especially when both the state association center output lines 195 and the action association center output lines 295 are used simultaneously to check complex act configurations at each data extraction step as herein shown. In some cases, it may be of advantage to stimulate the memory's intuitive faculty by disabling the inhibitive action of one or more of the CAO output lines 295 and/or one or more of the CAS output lines 195. A convenient way of doing this is to substitute an $l$ timing pulse for the $g$ pulse normally applied to each of the OR-circuits 196 and 296.

Before proceeding with the description of the data extracting means of the invention, certain elementary circuits utilized herein and referred to earlier in a general way will be more particularly described with reference to FIGS. 4–6.

Storage element (type-100–200 circuits)

FIG. 4 illustrates a form of circuit usable as each of the combinations of type-100 and type-200 circuits constituting a storage element of a storage center of the invention. It will be noted that the circuit shown comprises a chain of six relay switches. Of these, the first four, 601 through 604, constitute the type-100 circuit or storage element proper, while the last two relay switches constitute the associated type-200 circuit or enabling element.

The first two serially-connected relay switches 601 and 602 are respectively controlled by relay windings connected between ground and type-80 line or type-95 line respectively and are normally open as shown. When both these lines are simultaneously energized with an action input signal and a resulting state input signal respectively as earlier described, both relay switches are closed and establish a conductive path from ground through a winding controlling relay switch 603 to initial-state input line, type 55. In this condition, a positive voltage applied from source 17 through type-50 gate over type-55 line will energize the relay winding and close relay switch 603, whereupon a current path is established from type-55 line through conductor 605 and closed relay switch 603 and through the winding of relay switch 604 to ground, closing switch 604. It is noted that relay switch 603 constitutes a monostable binary element in that, once closed or set, it retains this condition on termination of the signal voltages applied to lines types 80, 95 and 55. It is also noted that relay 603 is constructed or adjusted so as to respond to the application of information input signals to its type-55 controlling line but not to the application of information-extraction signals applied to said line, as will later be apparent. Relay winding 604 however is arranged to respond to the application of an extraction pulse to type-55 line by closure of switch 604, provided of course relay switch 603 has first been closed.

Closure of relay switch 604 applies voltage to one of the three inputs of the type-200 circuit, which is a conventional three-input AND-circuit, the other two (enabling) inputs of which are constituted by the state- and action-association center output lines, types 190 and 290 respectively, connected through respective relay windings of the type-200 circuit to ground, as shown. Simultaneous application of signal voltages to the type-200 circuit over both types 190 and 290 lines closes the associated switches and enables the positive voltage at the output of the type-100 circuit, if present (i.e. if relay switch 604 is closed), to pass to the output of the type-200 circuit. Such output voltage is then applied through a type-400 diode to the particular type-95 line connected to the winding of relay switch 620 (see FIG. 1), and through a type-500 diode to the particular type-80 line connected to the winding of relay switch 601.

Modified storage element

FIG. 5 illustrates a more elaborate form of storage element that may be substituted for the storage element of FIG. 4, just described, and will then impart to the memory of the invention certain additional and highly advantageous features presently described. The element of FIG. 5 differs from the element of FIG. 4 in that the monostable relay switch 603 of the latter has been replaced by a circuit assembly including three relay switches 613, 614 and 615. Relay switch 613 acts as a bistable element and is provided with two separate, setting relay windings 613a and 613b and with a resetting or clearing winding 613c. Setting winding 613a is connected for energization from the type-55 line. Thus, on energization of the type-55 line with a positive voltage signal, switch 613 is closed or set (provided switches 601 and 602 are closed) just as the switch 603 was closed or set under similar circumstances in the circuit of FIG. 4. The winding of relay switch 614 is arranged (in a manner to be described) to be energized from the type-55 line upon the energization of the winding 613a, thereupon closing the relay switch 614. This relay switch 614 (which is monostable in character) serves as an alternative memory or storage element adapted to hold the information represented by the closed or open condition of relay switch 613 and thereby release this latter and make it available for the recording of other information. The winding of relay 614 is energized from the type-55 line, on closure of relay switch 613, by way of the normally-closed relay switch 615 connected between the winding of switch 614, and as shown. Switch 615 has a setting winding (shown below the switch 615) and a resetting or clearing (upper) winding. After switch 614 has been closed or set as a result of the closing or setting of switch 613, switch 613 can be opened or reset so as to clear it of the information stored therein. For this purpose, there is provided a transfer key 617 depression of which applies voltage through a diode 619 to the resetting winding 613c of switch 613 to ground, and simultaneously to the upper resetting winding of switch 615 to ground. Switch 613 is now free to store other information, whereas the information previously recorded in switch 613 is now held in switch 614, which is unable to change condition due to the opening or resetting of switch 615.

For restoring the previous information, as now stored in switch 614, into switch 613, there is provided a restoring key 618. Depression of key 618 first energizes, through line 621 including diode 620, the resetting winding 613c of switch 613 so that this switch is reset or opened. Depression of key 618 also acts through a delay circuit 616 to energize the setting winding of switch 615. The resulting closure of switch 615 reconnects the winding of switch 614 with switch 613 ensuring that switch 614 will again register the same condition as switch 613. Simultaneously, if switch 614 was closed, voltage is applied through it to the lower setting winding 613b of switch 613, to close or set switch 613. If switch 614 was open, however, switch 613 remains in the open or reset condition previously imparted to it through winding 613c. The diodes 619 and 620 serve to prevent spurious energization of the resetting and setting windings, of switch 615, on depression of keys 618 and 617 respectively. The keys should be constructed to act only momentarily and never at the same time.

The remaining parts of the circuit of FIG. 5 are identical with the corresponding parts of the circuit of FIG. 4, including both the input part of the circuit involving the relays 601, 602 controlled through lines types 80 and 95, and the output part or type-200 circuit involving the controlling lines types 190 and 290.

The substitution of storage elements of the kind shown in FIG. 5 for the simpler elements of FIG. 4 in one or more storage centers of the memory, or in parts thereof, makes it possible to use the transfer keys temporarily to cancel or remove (and store) all information pertaining to some specified states, actions or acts. The storage elements thus cleared may then be supplied with alternative information, developed, e.g. externally of the memory and applied by way of the selectors S1 and S2. There is thus provided a means of replacing all or part of the real acts recorded in a storage center CI with "conjectural" acts deriving from some assumed states and/or actions. Such conjectural data can then be combined by the memory with data deriving from real acts stored in the memory to suggest a hypothetical, or speculative, sequence having some given state or act (real or conjectural) as a starting point. The memory of the invention is thus endowed with a pseudo-imaginative faculty (different in character from the faculty earlier disclosed and called "intuition"), whereby it will be capable of developing entirely novel sequences of complex acts, i.e. novel procedures, for dealing with some given situation, and then testing the results of such procedures.

The control keys, types 617 and 618, may be grouped in one or more keyboards associated with one or more storage centers CI or with selected sections of storage centers.

*Association elements (type-165—type-265 circuits)*

FIG. 6 illustrates a form of circuit usable as each of the type-165 elements of a state association center CAS or the type-265 elements of an action association center CAO (FIG. 1). The circuit shown includes four relay switches 606, 607, 608 and 609 serially interconnected between a voltage source and an output line (leading to a type-185 AND-circuit, see FIG. 1). The four switches are controlled by respective relay windings all grounded at their one ends. The windings of relay switches 606 and 607 have their other ends connected in parallel with a signal input line which is a type-55 line if the element described forms part of a state association center CAS, and is a type-80 line if the element forms part of an action association center CAO, both said lines leading from one of the two adjacent storage centers which the association center being described serves to associate. Similarly, the windings of switches 608 and 609 have their free ends connected in parallel to a signal input line, type 55 or type 80 as the case may be, leading from the other of the two storage centers. The windings of relays 607 and 608 are adapted to respond by closure of the related switches only when energized by the relatively strong voltage present during information-input, not by the weaker voltage applied during an information-extracting pulse period, as later described. These windings have protective resistances 611, 612 in series with them. The windings of switches 606 and 609 cause closure of their related switches even when energized by a weak information-extracting signal.

When all four switches 606 through 609 are closed, a conductive path is established from the positive voltage source to the output of the circuit, and simultaneously energizes through a line 624 the winding of a relay switch 610 which shunts the intermediate two switches 607 and 608. Relay switch 610 is monostable and remains closed once closed. In the closed or set condition of relay switch 610, information-extracting or testing signals applied simultaneously over both type-55 lines, or both type-80 lines as the case may be, from the two adjacent storage centers related to the association center described will cause a positive voltage signal to be transmitted from the positive source through closed switch 610 to the related output AND-circuit. If however switch 610 was not previously set or closed by the application of corresponding data input signals, the data extracting signal will be ineffective.

The association element shown in FIG. 6 may be modified, in a manner analogous to the way the storage element of FIG. 4 was modified according to FIG. 5, in order to provide an alternative association element in which the setting of relay switch 610, as determined by an information-input signal, may be transferred to and stored in an alternative relay switch while the switch 614 is cleared and made available for recording other information. The modified circuit has not been shown but will be easily designed in the light of the explanations given. When the memory of the invention includes one or more association centers including elements of this modified type, it becomes possible to "assume" during an information extracting process certain conjectural or hypothetical relationships between elementary states, actions and acts of different storage centers in a manner similar to that described for the alternative storage elements of FIG. 5 in relation to the storage centers, thereby further extending the scope of capabilities and versatility of the memory system.

It is again emphasized that the foregoing description of circiuts shown in FIGS. 4, 5 and 6 is not to be considered as referring to a preferred, or even an especially desirable practical embodiment of the invention since, in practice, the corresponding circiuts would usually be designed as fast-acting electronic circuits rather than the electromechanical relay circuits illustrated. The electromechanical arrangements shown however provide a convenient way of clarifying the logical functions which the circuits are required to accomplish, and have been shown and described for this reason. Depending on the particular type of electronic equipment selected for use—such as solid-state elements, ferromagnetic cores, films, cryoelements or the like the corresponding circuits would assume a variety of forms, usually somewhat simpler than the electromechanical circuits illustrated, as well understood by the skilled computer engineer.

*Data extraction*

As earlier mentioned, the data stored in a memory system according to the invention may be extracted in a great variety of ways depending on the type of information desired. The following constitute important categories of data extraction procedures though not the only ones possible:

Testing for the presence of a given, simple or complex, state, action, or act;

Extracting the resulting state deriving from a given stored state by the application thereto of a given action, or extracting the complete act thus produced;

Testing for the feasibility of converting one state into another state and extracting the sequence of acts required for such conversion (strategy);

Extracting an ordered sequence of intermediate acts required to pass from a given primitive state SP to a given final state ST;

Extracting the shortest possible sequences in the last mentioned case;

Extracting all possible sequences in said case;

Extracting those of said sequences that include, or that do not include, one or more given intermediate states, actions or acts.

Since the extraction of a sequence of complex acts required to convert a given "primitive" complex state SPc to a given "terminal" state STc represents a broad process which encompasses all or most of the functions involved in the remaining data extracting procedures of which the apparatus is capable, it will be described below but it should be understood that the description is non-restrictive and only serves the purpose of explaining the construction and operation of data extracting means used in a preferred embodiment of the invention.

Data extracted from the memory system are assumed to be recorded in an external memory, not shown, which may take any desired form, including the improved form of memory according to this invention. The external memory may, if desired, be incorporated as part of the memory system herein described. It is noted that the order in which the complex acts of a sequence have been recorded in the external memory is easily ascertained since the resulting complex state Src of one complex act is the initial complex state Sdc of the next complex act, as earlier explained.

One of the N (herein four) storage centers CI of the ring-form memory system is arbitrarily designated as the first storage center CI-1, and an adjacent storage center is designated as CI-N; the intermediate storage centers are numbered CI-2 through CI-(N-1) in order. The two end storage centers CI-1 and CI-N have slightly different data extraction circuits from the intervening ones. In FIG. 1, the circuit connections applicable to all storage centers are shown in solid lines; the connections applicable only to CI-1 are shown in chain lines and those applicable only to CI-N in broken lines; connections that are to be omitted in CI-1 are indicated by double lines.

It is recalled that any complex state Sc consists of N elementary states each recorded in a respective one of the storage centers CI. The problem to which particular reference will be made in the ensuing description is that of extracting from the memory system, and recording in an external memory, the sequence of all the intermediate complex acts required to pass from a given "primitive" complex state SPc to a given final or "terminal" complex state STc. Intermediate complex states are understood as states of the sequence other than those involved in the primitive and terminal acts.

Associated with each storage center CI is a so-called primitive state input selector ESP, which may be a rotary selector switch or an equivalent electronic device, having as many switching positions as there are different states applicable to the storage center (herein four). When set to a selected one of its positions, selector EST is operative, on occurrence of extraction pulse $k$ (later referred to) to transmit the positive voltage of said pulse $k$ through a related one of the type-355 lines, then through gate 87 (opened on occurrence of extraction pulse 1) and the related type-50 gate, thereby opening said gate and allowing positive voltage from source 17 to pass to the selected type-55 line. In the data extraction procedure now being described, selector ESP is set so as to energize the particular type-55 line corresponding to the elementary state (relating to the storage center CI under consideration) forming part of the complex state specified as the primitive complex state SPc.

There is further associated with the storage center CI a so-called terminal state input selector EST also having as many selectable switching positions as there are elementary states, herein four, and in the present instance selector EST would be set to the particular position corresponding to the elementary state (relating to the storage center) forming part of the complex state specified as terminal complex state STc.

A so-called extractor key 301 is associated with selector EST. Depression of key 301 applies voltage to a control line 316 connecting with control and synchronizer unit H, causing the latter to stop producing the data input timing pulses ($a, b, c, d, e$) and to produce data extracting timing pulses instead, as will presently appear. Thus, extractor key 301 is only actuated when it is desired actually to initiate an information-extracting process. Depression of key 301 simultaneously energizes a relay 381 connected to line 316 and the resulting relay switch closure grounds the one ends of a set of relay windings, type 305, connected in a memory circuit M2, the other ends of the type 305 windings being connected to selector EST. Thus actuation of key 301 transfers the setting of selector EST to the memory M2 where it is stored for the duration of the extraction process. The selected elementary terminal state is stored in memory M2 as the displaced or set condition of a corresponding one of the four type-305 relay switches of the memory.

A further selector USI associated with the storage center is termed the intermediate state selector, and is a stepping selector having as many settings as there are states, plus one. Selector USI may be a rotary stepping switch or any electronic equivalent thereof, and has four type-310 lines extending therefrom and corresponding to its four "state" settings. A fifth line 315 extending from the selector USI causes, when energized, the selector to switch from one setting to the next, through any well-known electromechanical or electronic circuitry. Each of the four relay switches, type 305, of terminal-state memory M2, when in its normal or reset position, connects a related one of the four state setting lines, type 310, of selector USI to the stepping line 315, while in its displaced or set position each switch connects the related type-310 setting line to a related one of the type-355 lines leading through gate 87 to a related type-50 gate.

As indicated, selector USI is adapted during the first or checking period of the extraction cycle (also see FIG. 3) to receive a positive voltage signal $f$ from control unit H, and, during the second or effective period of the extracting cycle, an extracting or testing pulse train $h$, of negative polarity, later referred to. During the stepping action of selector USI, the signals applied to it are switched in turn to each of the type-310 lines. If the memory relay switch, type 305, connected to this type-310 line is normal or reset, the signal is applied from selector USI to stepping line 315, and the selector is thereby caused to step to its next position; this goes on until the selector reaches a position in which the energized type-310 line connects with a displaced or set type-305 relay switch, at which time the stepping action is arrested, and the selector retains this position, in which the signal applied to selector USI will be transmitted through the set type-305 switch to a related one of the type-355 lines as presently described.

The extracting cycle initiated by actuation of key 301 will now be described in detail. This cycle (see FIG. 3) consists of two periods. During a first period, the signals present are the persistent positive voltage $f$ and the short positive pulse $g$, produced near the start of the period. In the second period, the signals present are the persistent positive D.-C. voltage $k$, and the negative-polarity extracting or testing pulse trains $h$ and $i$ as well as an auxiliary negative pulse train $j$, of different frequencies. Further, the persistent positive voltage $l$ is present through both extracting periods. This voltage is applied to a relay winding 18 and the resulting opening of the relay switch cuts into circuit a normally short-circuited resistance in series with the voltage source 17 in order to reduce the effective potential applied during the extracting operations through the type-50 gates to the types-100, 200 circuits and the types-165, 265 circuits, and thereby prevent unwanted changes of state in any of these circuits, as previously mentioned.

*First extraction period*

During this period, the checking procedure earlier referred to is carried out to determine whether the set of elementary states, as entered by way of selectors EST and stored in the respective memories M2 of the storage centers CI, actually constitutes a complex state previously stored in the memory array, rather than a mere arbitrary aggregate of states. An energizing voltage applied to selector USI through line 316 on depression of switch 301 initiates the stepping or scanning action above described, and the selector is caused to reach a position in which the positive voltage $f$ is applied to the type-355 line corresponding to the state stored in memory M2. Gate 87 is at this time open (i.e. conductive) due to the presence of voltage $l$, so that the positive $f$ voltage present on the energized type-355 line is transmitted to the related type-50 gate. This gate now passes a reduced positive voltage from source 17, through additional resistance de-shorted by the opening of relay switch 18, a type-25 resistance and a type-5 line, and through said type-50 gate itself, to a related type-55 line.

The type-55 line thus energized energizes the one inputs of a related column of type-165 circuits in association center CAS. If and only if the selected elementary state forms part of a previously recorded complex act, one of the type-165 circuits of this column is in a conductive state and has its other input energized, and a voltage is applied to one input of the related type-185 AND-circuit.

Meanwhile, the narrow $g$ pulse emitted shortly after depression of key 301 is applied simultaneously to OR-gates 196 and 296, thereby briefly energizing the type-190 and type-290 lines and momentarily rendering the type-200 circuits conductive. In the event that any of the type-100 circuits of the storage unit, having as their initial state coordinate ($Sd$) the state selected by selector EST and stored in memory M2, was set during the previous data-input period (i.e. if any such type-100 circuits has its switch 603 and hence switch 604, see FIG. 4, closed), a conductive path is created from source 17 through the type-50 gate opened by the $f$ signal as described above, related type-55 line, closed switch 604, and momentarily closed switches of the type-200 circuit, through diodes types 400 and 500. The type-80 line thus energized through the type-500 diode applies a voltage to the one inputs of a column of type-265 circuits in association center CAO. If the selected elementary state forms part of a previously recorded complex act, one of the type-265 circuits of this column is conductive and has its other input energized, and a voltage is applied to one input of the related type-286 AND-circuit. Both the 195 and 295 lines are now energized and maintain a persistent positive voltage on a type-190 and a type-290 lines, so that the type-200 circuit relating to the set type-100 circuit remains persistently enabled on cessation of the brief $g$ pulse, and acts in turn to maintain persistent voltage on both lines 195 and 295. A D.-C. sensing circuit CV is connected to either of these lines, say line 295 as shown, and responds in a manner presently indicated to the presence of a persistent positive voltage thereon. If, on the other hand, the selected state stored in memory M2 did not form part of a complex act previously recorded in the memory system, as determined by the setting of storage center CI under consideration and the settings of state and action association centers CAS and CAO, then the other inputs of the types-185 and/or -285 AND-circuits of the association centers would be de-energized on cessation of the $g$ pulse, and a persistent voltage would not be applied to the enabling inputs of the type-200 circuit nor to lines 195 and 295, nor would sensing circuit CV respond.

Sensing circuit CV on sensing a persistent positive voltage transmits a signal over line 322 to the control unit H, causing the latter to switch to the second data-extracting period, i.e. to stop producing the timing signal $f$ and start generating instead the signals $h, i, j$ and $k$ (see FIG. 3). At the same time, through means not shown, the signal on line 322 transfers to the external memory, through means not shown, the complex state manifested by the present conditions of all the intermediate state selectors USI (and if desired also the complex action manifested by the present conditions of all the intermediate action selectors UAI, later referred to).

If, on the other hand, sensing circuit CV senses no voltage on cessation of the $g$ pulse, it transmits a positive signal, by way of a complementer 320, over a line 321. This signal is applied to control unit H to cause it to recommence another first extraction period. At the same time, the signal on line 321 is applied to selector USI of only the last storage center CI–N (i.e. selector USI–N), as indicated by broken lines in FIG. 1, to cause that selector to resume stepping operations until it reaches a new condition corresponding to a state stored in memory M2, as previously explained.

*Second extraction period*

During this period, the actual information extracting operations are performed. The period is initiated as the control unit H, on receipt of a signal from senser CV over line 322, starts transmitting the positive voltage signal $k$ and the negative pulse trains $h, i$, and $j$. The positive voltage signal $l$ also continues to be produced during this period.

The positive $k$ voltage is applied to gate 87, rendering the gate conductive, and to selector ESP, so that the selected one of the type-50 gates is rendered conductive by way of a type-355 line and the gate 87 which is conductive due to the presence of the $l$ signal. The $k$ voltage is also applied through a line 197 and a set of diodes in parallel to all the type-190 and type-290 lines so as to set all of the type-200 circuits, rendering them conductive. Hence, the positive voltage present on the selected type-55 line is able to pass through any of the type-100 circuits having the selected type-55 line as an $Sd$ input that are set, the related type-200 circuits, type-400 diodes, type-95 lines connected thereto, gates 88 and 87 to type-50 gates connected to said type-95 lines, thereby opening such type-50 gates. This now results in energizing all type-55 lines representing elementary states derivable from the selected elementary state by a single action (it is noted that each type-95 line is connected through gates 88, 87 and type-50 to the type-55 line representing the same elementary state as said type-95 line).

The negative $h$ pulse-train applied to selector USI is passed through a type-310 line, a set type-305 switch of memory M2, related type-355 line, hence (said signal being negative) through gate 88 which is conductive due to the presence of the $k$ signal, therethrough to the type-95 line connected to the selected type-355 line, a type-400 diode and a type-200 circuit now conductive due to the $k$ signal, then the type-100 circuit being tested if this circuit is set and thence to the type-55 line connected to that circuit and through type-50 gate (if conductive due to the $k$ signal from ESP), to the related type-5 line, thereby lowering the potential of this line to a zero or somewhat negative value. The circuit path just traced (over which the $h$ signal, being negative, flows in the reverse sense as just described), has an over-all resistance considerably less than that of each of the type-25 resistances connected between the type-5 lines and positive source 17. Thus, a periodic negative voltage corresponding in frequency to the $h$ signal appears on one of the type-5 lines, and in the primary winding of a type-335 sensing transformer connected in that line, and a corresponding frequency signal is induced in the secondary of that transformer. It will be seen from the above that the occurrence of an output signal in a type-335 senser manifests the presence of at least one set type-100 circuit having a type-55 or $Sd$ input corresponding to the state selected through selector ESP and a type-95 or $Sr$ input corresponding to the state selected through selector USI. Therefore, the particular type-335 senser in which an $h$-frequency signal is induced indicates a particular initial state $Sd$ having, as its resulting state $Sr$ in the sequence investigated, the state displayed by selector USI. All remaining type-335 sensers have D.C. voltages of positive or zero polarity in their primary windings, and hence do not produce any output signal.

The secondaries of the type-335 sensers are all connected to an output selector UD settable to as many successive positions or conditions as there are states plus one. Output selector UD is stepped through its positions in order to scan the outputs of the respective type-335 sensers, and any position in which it detects an $h$-frequency signal indicates an initial state $Sd$ having the state currently displayed by intermediate state selector USI as its resulting state $Sr$, i.e., a state that has preceded the currently displayed state in the system sequence starting with the primitive state SP. Thus the search for the successive states of the sequence can be performed in recurrent steps, starting with the given terminal state ST and going back step by step until the given primitive state SP has been reached.

As previously mentioned, an intermediate action selector UAI is provided and has the negative pulse train $i$ applied to it during the second extraction period (see FIG. 3). During this period, selector UAI is stepped through its positions in a manner similar to selector USI, and successively applies the $i$ signal to the four type-80 (action-input) lines connected to selector UAI. From the type-80 line, the $i$ signal is passed through a type-509 diode, then like the $h$ signal through a type-200 circuit conductive due to the $k$ signal, a type-100 circuit if set the type-55 line connected thereto and through a type-50 gate, rendered conductive by the $k$ signal from selector ESP, to the related type-5 line, inducing an output signal of the same frequency as the pulse train $i$ (different from the frequency of pulse train $h$) in the secondary of the related type-335 sensing transformer.

Output selector UD has its output connected in parallel to a low-pass filter 337 and a high-pass filter 338, adapted to pass the frequencies of the $h$ and $i$ signals respectively. When output selector UD receives both types of signals simultaneously, an output voltage is provided on a line 340 from an AND-circuit 339 having its inputs supplied from the respective filter circuits 337 and 338. The presence of such voltage on line 340 indicates that the elementary act having as its initial-state coordinate $Sd$ the position displayed on selector UD, as its action coordinate $a$ the position displayed on action selector UAI and as its resulting state coordinate $Sr$ the position displayed on intermediate state selector USI, was previously recorded in the memory and forms part of the system sequence being investigated.

The output line 340 is connected to the one inputs of four AND-circuits, type 360, having their other inputs connected to the respective outputs of the type-335 sensers. The outputs of the AND-circuits are connected to the respective relay windings, type 365, of a so-called data extraction memory M1. Thus the simultaneous presence of $h$ and $i$ signals on a particular type-335 senser acts to set a corresponding one of the type-365 relay switches of memory M1.

Intermediate action selector UAI is arranged to be stepped through its successive positions by means of the $j$ signal applied to a stepping input of it so as to scan all the type-80 lines in succession. On reaching a fifth position, the selector UAI applies the $i$ signal to a line 370 connected to output selector UD, thereby causing this latter to advance one step in its scanning cycle; thereafter, action selector UAI begins a fresh scanning cycle of its own. When output selector UD in turn has reached the last step of its cycle, all the possibilities in respect to the search for a recorded state having preceded the state currently displayed on intermediate state selector USI, and forming part of a sequence starting with the given primitive state SP, have been exhausted.

The last (fifth) position of the output selector UD is not connected to any of the type-335 sensors and, when the selector has reached this position selector UD is not advanced on a fresh scanning cycle by the signal on line 370, but generates a voltage signal on a line 341. When all N output selectors UD of the respective storage centers of the memory have reached their ultimate positions, an AND-circuit 371, common to the storage centers and having the respective lines 341 applied to its inputs, produces a voltage on a line 372. This voltage is applied to the intermediate state selector USI-N relating to the last storage center CI-N of the memory, to cause that selector to advance to its next active position, i.e. its next position corresponding in a set type-305 switch in memory M2. Simultaneously, the voltage on line 372 is applied by a line 321 to the synchronizer unit H, which is thereby caused to arrest the production of data extraction signals $h$, $i$, $j$, $k$ and resume the production of checking signals $f$ and $g$, i.e. to return to the initial extraction period. The entire checking and extracting cycle described above is thereupon resumed in the new position of selector USI-N.

It is noted that the scanning action of the action selectors UAI of all the storage centers should be synchronized by any suitable means not shown, so that the stepping signal shall only be transmitted therefrom over line 370 to the related output selectors UD in the initial position of their cycle after the selectors UAI have completed their scanning cycles.

When selector USI-N relating to storage center CI-N has reached its last scanning position, it returns to its initial position and simultaneously applies a signal through a line 373 to selector USI-(N-1) relating to the next lower storage center to cause an advance of this latter selector. When selector USI-(N-1) in turn has reached its last scanning position, it returns to its initial position and causes advance of the next lower selector USI-(N-2), and so on. When selector USI-1 has reached its last position, the data extracting means described have tested all the possibilities for extracting preceding elementary states from the complex states obtained as combinations of elementary states stored in the M2 memories. All such "preceding" elementary states are at this time stored in the M1 memories.

Selector USI-1 on reaching its ultimate position emits a signal over a line 374 (shown in chain lines), with the following three effects:

First, the signal on line 374 is applied to a relay 376 to close a related switch applying positive voltage to resetting or comparing windings associated with the respective type-305 relay switches of memory M2, thereby clearing that memory.

Second, the voltage on line 374, acting through a delay circuit 375 is applied to a relay 377 to close a related switch and energize a relay 381 which thereupon closes a switch serving to ground one terminal off all the input windings of the type-305 switches of memory M2, the other terminals of said input windings being connected to respective windings of the stype-365 relays of memory M1, so that the information stored in memory M1 is now transferred into memory M2.

Third, the voltage on line 374, acting through delay circuit 375 and a further delay circuit 378 in series with it, energizes a relay 379 to close a switch and apply positive voltage to all of the resetting windings associated with the type-365 relay switches of memory M1, thereby clearing that memory.

Meanwhile, the output selectors UD have been returned to their initial scanning positions by the output voltage from AND-circuit 371 applied thereto by a line 380 connected to line 372. A fresh extraction cycle is now initiated to extract from the memory system any complex act or acts preceding the complex act displayed in the set of memories M2.

The type-365 switches of memory M1, when in their set positions, apply positive voltage to the one inputs of respective AND-circuits, type-385, the other inputs of which are connected to the respective type-355 lines. The occurrence of a voltage signal at the output of a type-385 AND-circuit indicates that the state displayed in memory M1, and the given primitive state displayed by the setting of primitive state input selector ESP, are the same. The outputs from the type-385 AND-circuits of each storage center are combined by an OR-circuit and their combined output is applied to one input of an AND-circuit 390 common to all the storage centers of the memory. When all the inputs of AND-circuits 390 are energized, the AND-circuit produces an output signal over a line 391, indicating that the search procedure is completed, and that the shortest sequence from the given primitive complex state SPc to the given final complex state STc has been extracted from the memory. The signal on line 391 may then be applied to the control unit H to cause the latter to stop producing extracting signals and resume the production of information input signals (*a* through *e*) instead, i.e. restore the system to the data input mode of operation.

However, it may be desired, on having completed the extraction of the shortest recorded sequence, to extract other sequences existing between the given primitive and terminal states SP*c* and ST*c*. The extraction procedure described may then be resumed after having eliminated one or more of the intermediate states of the shortest sequence previously ascertained.

There are various methods available for eliminating sequences including one or more selected intermediate states (or actions or acts). One convenient method is to energize the reset winding corresponding to a state that is to be eliminated. A selected action may be eliminated by preventing the *i* signal from reaching the corresponding type-80 line. Another possible method of selecting sequences is to effect the selection on the external memory.

It will be understood that the data extraction procedure described above may be modified in a great variety of ways while retaining equivalent results, and, further, that it may in many cases be simplified depending on the kind of information desired. Thus, where the object is simply to determine the state resulting from the application of a given action *a* to a given initial state S*d*, the following simple procedure may be used: set primitive state input selector ESP to the given initial state S*d*, so that the positive voltage is applied to the corresponding type-55 line; set action selector AUI to the given action *a*, so that the *i* signal is applied to the related type-80 line; and step output selector UD through a scanning cycle to scan the respective output lines from type-335 sensors. The only two lines to produce an output A.C. signal will be the line corresponding to the given initial state S*d* and the line corresponding to the desired resulting state S*r*.

The control and synchronizer unit H may be controlled to place the memory system alternately in the information-input mode and the information-extracting mode according to requirements, by selective manual action (as implied in the description above) or automatically, e.g. under control of signals applied to the synchronizer from some external source, as suggested by the showing of control lines 3 and 4 in FIG. 1.

The timing or control signals produced by the synchronizer unit H may assume various forms other than those described. The negative pulse trains of different frequencies (*h* and *i*) used as testing signals applied to the state and action input lines respectively are only one convenient form of usable testing signal, convenient because it provides a simple way of distinguishing between the testing signals and the positive D.C. voltages present on the lines tested, as well as between the testing signals relating to states and actions. Also the use of negative testing signals in the embodiment described ensures that a testing signal will not produce an unwanted opening of a type-50 gate circuit. However, the circuiting may readily be altered to admit of correct operation with other types and polarities of signals than those used in the embodiment.

The gate circuits 87 and 88, in the embodiment shown, and as will be understood from the foregoing, serve to prevent any signals present on the type-95 lines S*r* to propagate to the type-55 lines during data-input operations. Moreover gate 88 prevents propagation, during data extraction, of a positive voltage applied to a single type-55 line by the action of selector USI, through the types 100 and 200 circuits and type-95 lines, when checking for the presence of a complex state encompassing the state selected by selector USI.

As already noted, the storage centers and state- and action-association centers (where these are used) may be connected in arrays of various types, other than the ring array with the storage and association centers alternating serially around the ring, as in the embodiment selected for illustration. The appropriate modifications that would then have to be introduced into the system of the selected example will be easily accomplished by any skilled computer engineer in the light of the explanations given herein.

An additional remarkable property of the storage system of the invention is that the time, required for extracting from storage the shortest interconnecting sequence between two given states, is independent of the amount of information previously stored. In other words, the extraction or recall of a strategic sequence is not slowed down, regardless how long the apparatus has been maintained in operation.

I claim:

1. An information-processing system comprising at least one three-dimensional matrix array of settable storage elements each having three inputs concurrently energizable to set the element; three input assemblies for said array providing digital information signals defining an initial state, an action and a resulting state respectively; said storage elements corresponding in number to the number of possible combinations of said initial states, actions and resulting states; means for applying said digital information signals to the respective inputs of selected storage elements whereby the setting of a storage element will indicate a particular combination between an initial state, an action, and a resulting state; and information extracting means for sensing the particular elements that are set.

2. The system of claim 1, including a state selector device, means connecting said device to both said input assemblies providing information defining the initial and resulting states respectively, including means for applying an information signal defining a common state as designated by said state selector device to selected inputs of the respective input assemblies.

3. The system of claim 1, including an action selector device, and means connecting said device to the input assembly providing said action-defining information.

4. An information-processing system comprising a set of more than one three-dimensional matrix arrays of settable storage elements each having three inputs concurrently energizable to set the element; three input assemblies for each array providing digital information signals defining an initial elementary state, an elementary action and a resulting elementary state respectively; the storage elements in each array corresponding in number to the number of possible combinations of said initial elementary states, elementary actions and resulting elementary states relating to the array; means for concurrently applying said signals to the respective inputs of selected storage elements in the respective arrays whereby the setting of a set of storage elements of the set of arrays will indicate a particular combination between an initial complex state, a complex action and a resulting complex state, and information extracting means for sensing the sets of elements that have been concurrently set in the respective arrays.

5. The system of claim 4, including means for inhibiting the extraction of digital information relating to an element of one array which was not applied to that element concurrently with corresponding digital information applied to an element in at least one other array.

6. The system of claim 4, comprising enabling circuit means associated with said storage elements operative normally to prevent extraction of digital information stored in said elements and each having at least one enabling signal input operable to enable such extraction, and association center means operative during extraction of information from said arrays to operate the enabling inputs of only those enabling circuit means to whose related storage elements digital information signals were applied concurrently.

7. The system of claim 6, wherein each enabling circuit has two enabling signal inputs, and said association center means include a state association center adapted to operate a first enabling input of only those enabling circuits to whose related storage element initial state information signals were applied concurrently, and an action association center adapted to operate a second enabling input of only those enabling circuits to whose related storage elements action information signals were applied concurrently.

8. The system of claim 6, wherein the association center means comprise matrix means of settable storage elements connected to corresponding storage elements of respective arrays so as to be set on concurrent application of information signals to predetermined combinations of storage elements of the respective arrays.

9. An information-processing system comprising a set of more than one storage centers each comprising a three-dimensional matrix array of settable storage elements each having three inputs concurrently energizable to set the element; three input assemblies for each storage center providing digital information signals defining an initial elementary state, an elementary action and a resulting elementary state respectively; the storage elements in each storage center corresponding in number to the number of possible combinations of said initial elementary states, elementary actions and resulting elementary states relating to the array; means for concurrently applying said signals to the respective inputs of selected storage elements in the respective arrays whereby the setting of a set of storage elements will indicate a particular complex act defined as a combination between an initial complex state, a complex action and a resulting complex state; at least one association center comprising a matrix of settable elements connected to corresponding elements of respective ones of at least two storage centers so as to be set on concurrent application of information signals to certain sets of associated storage elements of said respective storage centers; information extracting means connected to said storage centers and selectively operable to apply testing signals to storage elements thereof; sensing means connected to the storage elements of each storage center and selectively energizable on application of a testing signal to a storage element that has been set; means normally inhibiting the energization of said sensing means; and means connected to said association center for permitting the energization of the sensing means on concurrent application of testing signals to a set of associated storage elements of the respective storage centers for which a corresponding element of the association center has been set; whereby to permit extraction from said storage centers of information relating to said complex acts while inhibiting the extraction of information relating to sets of storage elements other than the sets constituting said complex acts.

10. The system claimed in claim 9, wherein said storage centers are arranged in a closed loop, with at least one association center connected to the storage elements of each adjacent pair of storage centers of the loop.

11. The system claimed in claim 1, having means in said storage elements operative to complete an electrically conductive path through the element when set, and wherein said information extracting means comprise means for applying testing electric signals to selected storage elements to test the completion of said paths therethrough.

12. The system claimed in claim 1, having means in said storage elements operative when the element has been set to complete an electrically conductive path through the element from an initial-state input to the resulting-state and action inputs thereof, and wherein said information extracting means comprise means for applying testing signals to the resulting-state and action inputs of selected storage elements, and sensing means for sensing the electric condition of the initial-state inputs of the storage elements.

13. The system claimed in claim 1, comprising auxiliary settable elements associated with each of at least some of the storage elements of the array, means for selectively transferring the set state of a storage element to the associated auxiliary element thereby clearing said storage element, and means for selectively transferring the set state from an auxiliary element back to the associated storage element.

14. The system claimed in claim 8, comprising auxiliary settable elements associated with each of at least some of the storage elements of the association center means, means for selectively transferring the set state of an association center element to the associated auxiliary element thereby clearing the association center element, and means for selectively transferring the set state from an auxiliary element back to the associated association center element.

15. An information-processing system comprising: a matrix of settable storage elements defining an array of at least three dimensions, said matrix having at least three inputs concurrently energizable to set the elements; at least three input assemblies for said array providing digital information signals defining initial state, action and resulting state, respectively; said storage elements corresponding in number to the number of possible combinations of said initial states, actions and resulting states; means for applying said digital information signals to the respective inputs of selected storage elements whereby the setting of a storage element will indicate a particular combination between an initial state, an action, and a resulting state; and information extracting means for sensing the particular elements that are set.

No references cited.

ROBERT C. BAILEY, *Primary Examiner.*

R. B. ZACHE, *Assistant Examiner.*